United States Patent
Mandai et al.

(10) Patent No.: US 10,469,719 B2
(45) Date of Patent: Nov. 5, 2019

(54) IMAGING UNIT, AND VEHICLE WINDSHIELD AND VEHICLE EQUIPPED WITH SAME

(71) Applicant: Nidec Copal Corporation, Tokyo (JP)

(72) Inventors: Haruhiko Mandai, Tokyo (JP); Yuta Nakamura, Tokyo (JP); Masaki Nakashima, Tokyo (JP)

(73) Assignee: Nidec Copal Corporation, Tokyo (JP)

( * ) Notice: Subject to any disclaimer, the term of this patent is extended or adjusted under 35 U.S.C. 154(b) by 0 days.

(21) Appl. No.: 15/756,004

(22) PCT Filed: Jun. 22, 2016

(86) PCT No.: PCT/JP2016/068575
§ 371 (c)(1),
(2) Date: Feb. 27, 2018

(87) PCT Pub. No.: WO2017/038216
PCT Pub. Date: Mar. 9, 2017

(65) Prior Publication Data
US 2018/0343368 A1 Nov. 29, 2018

(30) Foreign Application Priority Data

Aug. 28, 2015 (JP) .................................. 2015-169016
Mar. 18, 2016 (JP) .................................. 2016-056079

(51) Int. Cl.
*H04N 5/00* (2011.01)
*B60R 11/04* (2006.01)
(Continued)

(52) U.S. Cl.
CPC ........... *H04N 5/2254* (2013.01); *B60R 11/04* (2013.01); *H04N 5/2252* (2013.01); *H04N 5/2253* (2013.01); *B60R 2011/0026* (2013.01)

(58) Field of Classification Search
None
See application file for complete search history.

(56) References Cited

U.S. PATENT DOCUMENTS 6,386,742 B1 * 5/2002 DeLine ............... B60Q 1/2665
362/494
7,609,322 B2 * 10/2009 Takada ................... G02B 7/026
348/360
(Continued)

FOREIGN PATENT DOCUMENTS

EP 2293120 A1 * 3/2011 ............. G02B 1/118
JP 2006-293093 A 10/2006
(Continued)

OTHER PUBLICATIONS

International Search Report dated Sep. 20, 2016 during the prosecution of International Application No. PCT/JP2016/068575.

*Primary Examiner* — Reza Aghevli
(74) *Attorney, Agent, or Firm* — Troutman Sanders LLP

(57) ABSTRACT

An imaging unit has an imaging device that has an imaging lens; a case that encloses an imaging device and that has an imaging portion for passing light that is to be incident into an imaging lens; and an extending portion that extends from the opening portion in the imaging direction of the imaging device. The extending portion has an extending surface that is provided with a scattering portion for scattering light through structural units. Each structural unit has a surface structure for reflecting, in at least two mutually differing directions that are inclined in relation to a first vertical plane, light that is inclined in the imaging direction relative to an axis that is perpendicular to the extending surface, and that is parallel to a first vertical plane that is perpendicular to the extending surface and that includes the optical axis of the imaging lens.

15 Claims, 31 Drawing Sheets

(51) Int. Cl.
*H04N 5/225* (2006.01)
*B60R 11/00* (2006.01)

(56) References Cited

U.S. PATENT DOCUMENTS

| | | | |
|---|---|---|---|
| 2012/0106164 A1* | 5/2012 | Michaelis | G02B 3/0043 |
| | | | 362/311.02 |
| 2012/0133851 A1* | 5/2012 | Suga | G02B 27/283 |
| | | | 349/9 |
| 2015/0015713 A1* | 1/2015 | Wang | H04N 7/18 |
| | | | 348/148 |
| 2016/0243942 A1* | 8/2016 | Sato | G02B 27/0149 |
| 2017/0038575 A1* | 2/2017 | Pretorius | G02B 21/16 |
| 2017/0164820 A1* | 6/2017 | Segawa | A61B 1/0011 |

FOREIGN PATENT DOCUMENTS

| | | | | |
|---|---|---|---|---|
| JP | 2006293093 A | * | 10/2006 | G02B 7/02 |
| JP | 2007-264714 A | | 10/2007 | |
| JP | 2012-166615 A | | 9/2012 | |
| JP | 2015-18178 A | | 1/2015 | |
| WO | WO-2013123161 A1 | * | 8/2013 | H04N 7/18 |

* cited by examiner

IMAGING UNIT, AND VEHICLE WINDSHIELD AND VEHICLE EQUIPPED WITH SAME

CROSS-REFERENCE TO RELATED APPLICATIONS

This is a U.S. national phase application under 35 U.S.C. § 371 of International Patent Application No. PCT/JP2016/068575, filed Jun. 22, 2016, and claims benefit of priority to Japanese Patent Application Nos. 2015-169016, filed Aug. 28, 2015 and 2016-056079, filed Mar. 18, 2016. The entire contents of these applications are hereby incorporated by reference.

FIELD OF TECHNOLOGY

The present invention relates to an imaging unit, and to a vehicle windshield and vehicle equipped therewith.

BACKGROUND

There are advances in development of driving assistance systems using onboard cameras. For example, it is possible to identify the position in a lane from an image captured by an onboard camera using the lane recognition apparatus set forth in Japanese Unexamined Patent Application Publication 2007-264714.

Such an onboard camera is mounted within a vehicle so that the top surface of a case, wherein a camera lens is exposed, faces the windshield of the vehicle. In the onboard camera set forth in Japanese Unexamined Patent Application Publication 2012-166615, light that is incident on the windshield from below, within the vehicle, is blocked by a portion of the case, preventing the light in the windshield from being reflected in.

In the onboard camera set forth in Japanese Unexamined Patent Application Publication 2012-166615, a portion of the case, which prevents the incursion of reflections at the windshield, extends further toward the imaging direction than the position of the camera lens, and thus the surface that extends further than the camera lens in the imaging direction (that is, the top surface in the interior of a recessed portion) reflects light that has passed through the windshield from the outside of the vehicle. When this reflected light is incident into the camera lens, it may produce ghosting, flaring, or the like, in the image that is captured.

The present invention was created in contemplation of the situation set forth above, and the object thereof is to provide an imaging unit, and a vehicle windshield and vehicle equipped therewith, able to prevent the production of ghosting and flaring in an image that is captured, through reducing light that is incident into the imaging lens through reflection by the surface that is positioned on the imaging direction side of the imaging lens.

SUMMARY (1) In order to achieve the object set forth above, an imaging unit according to a first aspect according to the present invention includes:

an imaging device having an imaging lens;

a case for enclosing at least a portion of the imaging device, and having an opening portion for passing light that is to be incident into the imaging lens of the imaging device from an imaging object; and an extending portion that extends from the opening portion of the case in the imaging direction of the imaging device, wherein:

the extending portion has a first extending surface that is positioned on the optical axis side of the imaging lens;

a scattering portion, for scattering incident light through a plurality of structural units is provided on the first extending surface; and each of the structural units has a surface structure for reflecting, in at least two mutually differing directions that are inclined relative to the first vertical plane, when the first extending surface is viewed in a plan view, light that is inclined in the imaging direction of the imaging device relative to an axis that is perpendicular to the first extending surface, that is incident from a direction that is inclined relative to the first extending surface, and that is parallel to a first vertical plane that is perpendicular to the first extending surface and that includes the optical axis of the imaging lens.

(2) In (1), above, when a second vertical plane that is perpendicular to the first vertical plane and that is perpendicular to the first extending surface is assumed, and the first extending surface is viewed in the plan view, each of the structural units may have, at least, a first surface and a second surface that are positioned toward the imaging direction side of the imaging device, and a surface that is positioned toward the opening portion side, wherein: the first surface and the second surface may be inclined relative to the first vertical plane and the second vertical plane, and may be mutually inclined in opposing directions relative to the first vertical plane.

(3) In (2), above, of the first surface and the second surface, at least one may be inclined in a direction wherein the top ends approach each other, relative to a plane that is vertical to the first extending surface.

Structuring as in (1) through (3), above, enables suppression of the production of ghosting and flaring in an image that is captured, through reducing light that is incident into the imaging lens through reflection by the surface that is positioned further toward the imaging direction side from the imaging lens.

(4) In (2) and (3), above, of the first surface and the second surface, at least one may be a curved surface. Through structuring in this way, the structural units will reflect at different angles depending on the position with which the light is that is parallel to the first vertical plane is incident, enabling further suppression of light that is incident into the imaging lens through being reflected by the surface that is reflected further toward the imaging direction than the imaging lens.

(5) Moreover, in (2) through (4), above, the first surface and the second surface may be connected. Structuring in this way enables a reduction in the light that is reflected, by the structural units, in the direction that is parallel to the first vertical plane, enabling further suppression of light that is incident into the imaging lens through being reflected by the surface that is reflected further toward the imaging direction than the imaging lens.

(6) In (2), above, the plurality of structural units may be of one or more selections from pyramids, truncated pyramids, cones, truncated cones, hemispheres, and circular columns.

(7) In (1), above, when a second vertical plane that is perpendicular to the first vertical plane and that is perpendicular to the first extending surface is assumed, and the first extending surface is viewed in a cross-sectional view from the imaging direction of the imaging device, each of the structural units may have a third surface and a fourth surface that are perpendicular to the second vertical plane, and the third surface and the fourth surface may be inclined in directions wherein the top ends thereof approach each other, relative to the first vertical plane.

(8) In (7), above the structural unit may have a fifth surface that is connected to the third surface and the fourth surface.

Structuring as in (7) or (8), above, enables suppression of the production of ghosting and flaring in an image that is captured, through reducing light that is incident into the imaging lens through reflection by the surface that is positioned further toward the imaging direction side from the imaging lens.

(9) In (7) and (8), above, of the third surface and the fourth surface, at least one may be a curved surface. Through structuring in this way, the structural units will reflect at different angles depending on the position with which the light is that is parallel to the first vertical plane is incident, enabling further suppression of light that is incident into the imaging lens through being reflected by the surface that is reflected further toward the imaging direction than the imaging lens.

(10) In (7), above, the plurality of structural units may be of pyramids and/or truncated pyramids.

(11) In (1) through (10), above, when the first extending surface is viewed in the plan view, the structural units may be arrayed in the imaging direction of the imaging device and in the direction that is perpendicular to the imaging direction of the imaging device.

(12) In (1) through (11), above, the extending portion may be a portion of the case.

(13) In (1) through (11), above, an attaching portion for attaching the case to a vehicle may be provided, wherein: the extending portion may be a portion of the attaching portion.

(14) A vehicle windshield according to a second aspect according to the present invention has the imaging unit set forth above.

(15) A vehicle according to a third aspect according to the present invention includes the imaging unit set forth above.

The present invention enables suppression of the production of ghosting and flaring in an image that is captured, through reducing light that is incident into the imaging lens through reflection by the surface that is positioned further toward the imaging direction side from the imaging lens.

BRIEF DESCRIPTIONS OF THE DRAWINGS

DETAILED DESCRIPTION

An imaging unit 100 according to the present example will be explained in reference to FIG. 1 through FIG. 7.

Figure 1:
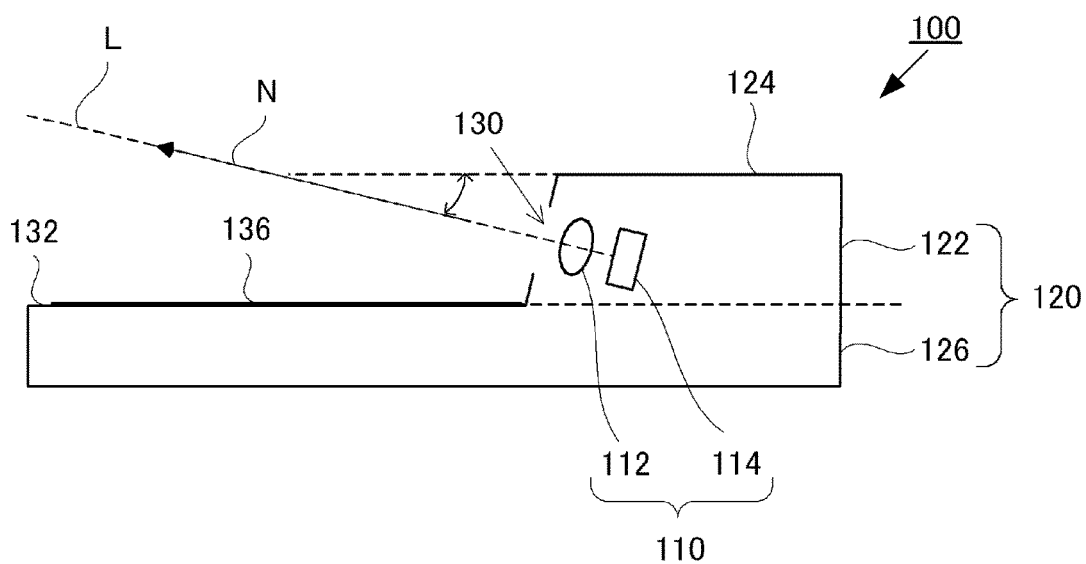
FIG. 1 is a cross-sectional view illustrating a cross section of an imaging unit according to an example according to the present invention.

The imaging unit 100, as illustrated in FIG. 1, comprises an imaging device 110, for capturing an image, and a case 120. The case 120 has a box-like shape, and a step in the height direction. The case 120 comprises a top step part 122, for enclosing the imaging device 110, and a bottom step part 126, for enclosing a circuit board (not shown), and the like.

The imaging unit 100 images an imaging object (not shown) within a prescribed region in the direction of travel M of a vehicle 10.

Figure 2:
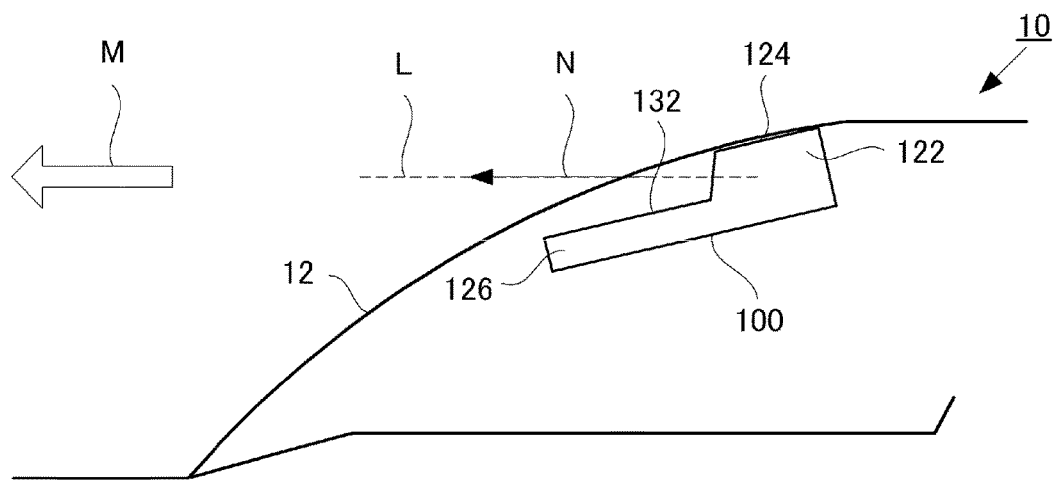
FIG. 2 is a schematic diagram depicting a vehicle provided with an imaging unit as set forth in an example according to the present invention.

As illustrated in FIG. 2, the imaging unit 100 is attached to a windshield 12 of a vehicle 10, through adhering a top surface 124 of the top step part 122 of the case 120 to the windshield 12 of the vehicle 10. In the imaging unit 100, the bottom step part 126 of the case 120 faces the direction of travel M of the vehicle 10. In this case, the top surface 132 of the bottom step part 126 of the case 120 faces the windshield 12 of the vehicle 10.

The imaging device 110 is structured from an imaging lens 112 that has an optical axis L, and an imaging element 114. The imaging unit 100 is attached to the windshield 12 of the vehicle 10, the imaging direction N of the imaging device 110, the optical axis L of the imaging lens 112, and the direction of travel M of the vehicle 10 are all coincident.

Light from an imaging object, which passes through an opening portion 130 of the case 120, is incident into the imaging lens 112. An image of the imaging object is focused onto the imaging element 114.

The imaging element 114 is an image sensor such as a CCD (a Charge-Coupled Device), a CMOS (Complementary Metal Oxide Semiconductor), or the like.

In the imaging device 110, as illustrated in FIG. 1, the imaging lens 112 faces the opening portion 130 of the case 120, and is enclosed in the top step part 122 of the case 120. Moreover, the direction of travel M of the vehicle 10, and the imaging direction N of the imaging device 110 and the optical axis L of the imaging lens 112, are all coincident, and thus the imaging device 110 is enclosed in the case 120 in a state wherein the optical axis L of the imaging lens 112 is directed toward the top surface 124 of the top step part 122.

The case 120 is made out of a metal, such as die cast aluminum, die cast magnesium, or the like. Moreover, the case 120 is blackened.

The case 120 encloses the imaging device 110 in the top step part 122 thereof.

Figure 3:
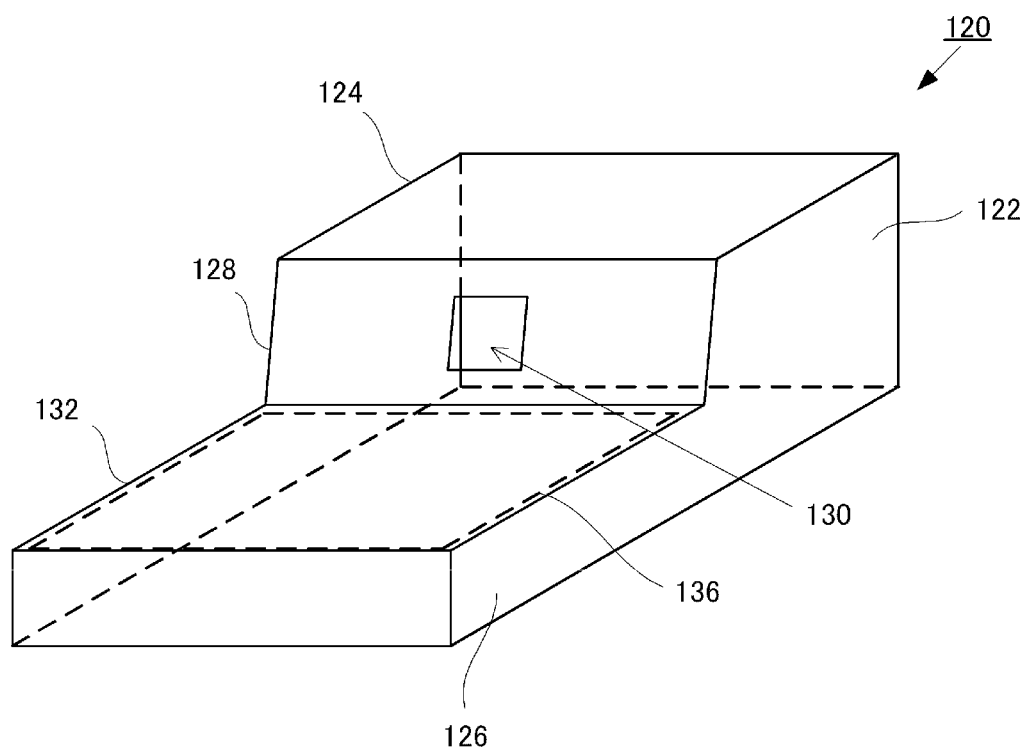
FIG. 3 is a perspective diagram illustrating a case according to an example according to the present invention.

A stepped side surface 128 of the case 120, as illustrated in FIG. 3, is inclined toward the imaging direction N of the imaging device 110. An opening portion 130 is provided in the center of the stepped side surface 128.

The opening portion 130 of the case 120 passes light from the imaging object, to be incident into the imaging lens 112 of the imaging device 110. Note that a transparent plate (not shown), which has transparency, is provided in the opening portion 130 of the case 120.

A scattering portion 136 is provided on the top surface 132 of the bottom step part 126 of the case 120.

In the present example, the opening portion 130 of the case 120 is provided in the stepped side surface 128 of the case 120. Moreover, the imaging device 110 is enclosed within the case 120, with the imaging lens 112 facing the opening portion 130 of the case 120. Consequently, the top surface 132 of the bottom step part 126 is a surface that is positioned on the optical axis L side of the imaging lens 112 in a part that extends in the imaging direction N of the imaging device 110 from the opening portion 130.

The scattering portion 136 is structured from a plurality of square pyramids 140, arranged on the top surface 132 of the bottom step part 126.

Figure 7:
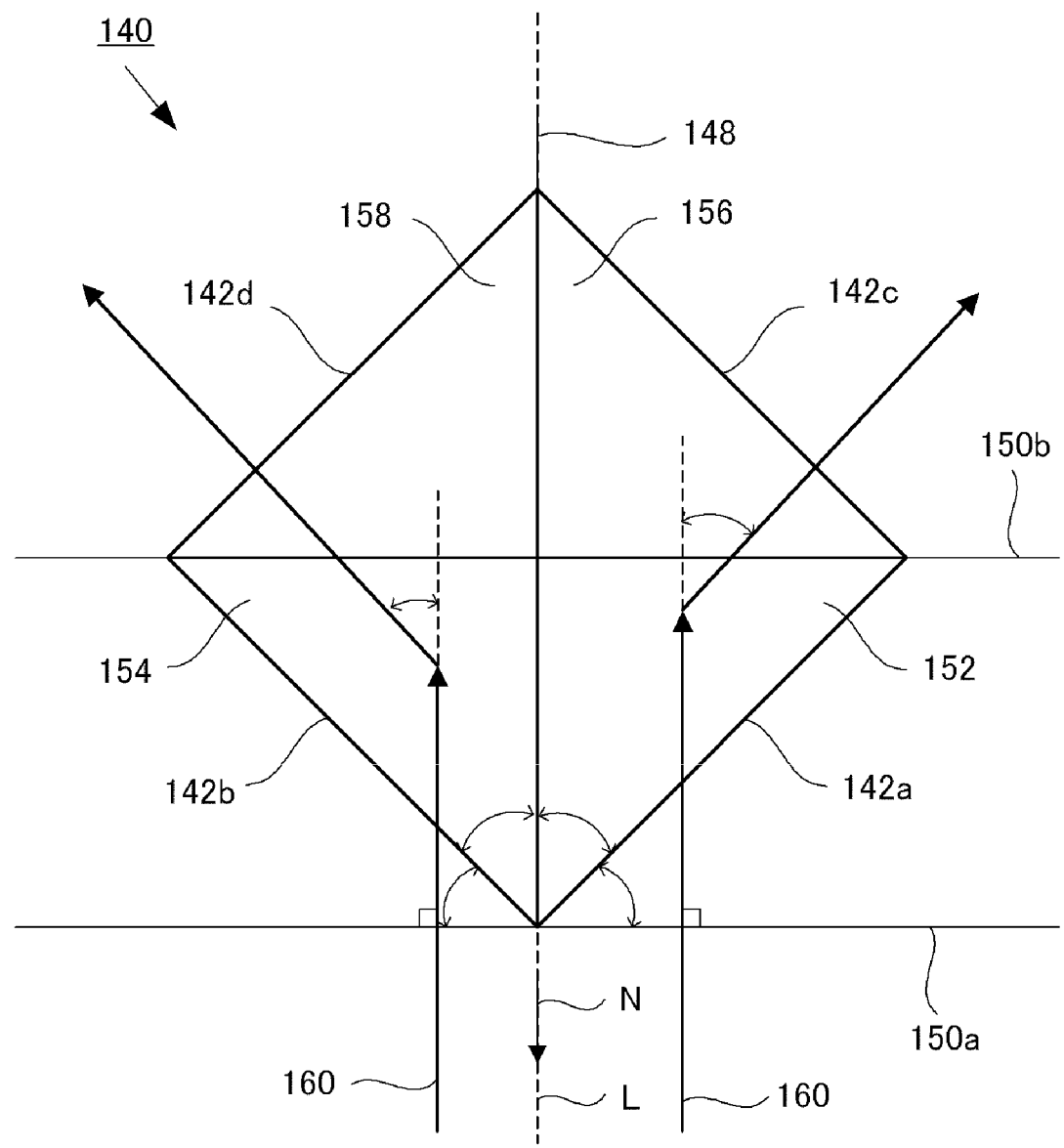
FIG. 7 is a plan view for explaining reflections in the square pyramid according to the example according to the present invention.

The arrangement of the square pyramids 140 will be explained first in reference to FIGS. 4, 5, and 7. Note that, for ease in understanding, only a single square pyramid 140 is shown in FIGS. 4 and 7.

Figure 4:
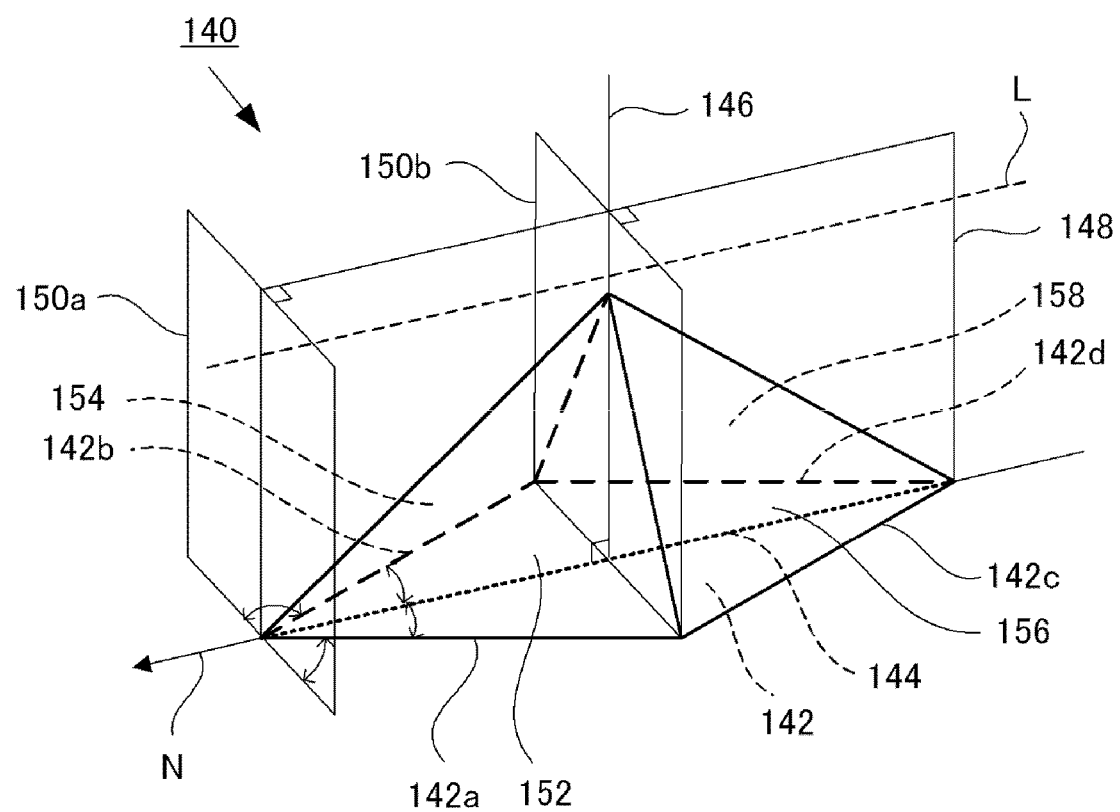
FIG. 4 is a perspective diagram illustrating a square pyramid for structuring a scattering portion according to the example according to the present invention.

As illustrated in FIG. 4, each individual square pyramid 140 has a square bottom surface 142. Each individual square pyramid 140 is disposed so that the diagonal line 144 of the bottom surface 142 is parallel with the imaging direction N of the imaging device 110 (the optical axis L of the imaging lens 112), when the top surface 132 of the bottom step part 126 is viewed in the plan view.

Here the axis that is perpendicular to the top surface 132 of the bottom step part 126 is defined as the vertical axis 146, the plane that includes the optical axis L of the imaging lens 112 and that is perpendicular to the top surface 132 of the bottom step part 126 is defined as the first vertical plane 148, and the planes that are perpendicular to the top surface 132 of the bottom step part 126 and perpendicular to the first vertical plane 148 are defined as second vertical planes 150a and 150b.

The second vertical plane 150a is positioned at a corner in the bottom surface 142. The second vertical plane 150b is positioned so as to cut across the square pyramid 140. Moreover, because the first vertical plane 148 includes the optical axis L of the imaging lens 112, it is perpendicular to the opening portion 130 of the case 120. Note that these relationships are true in the other examples as well.

Figure 5:
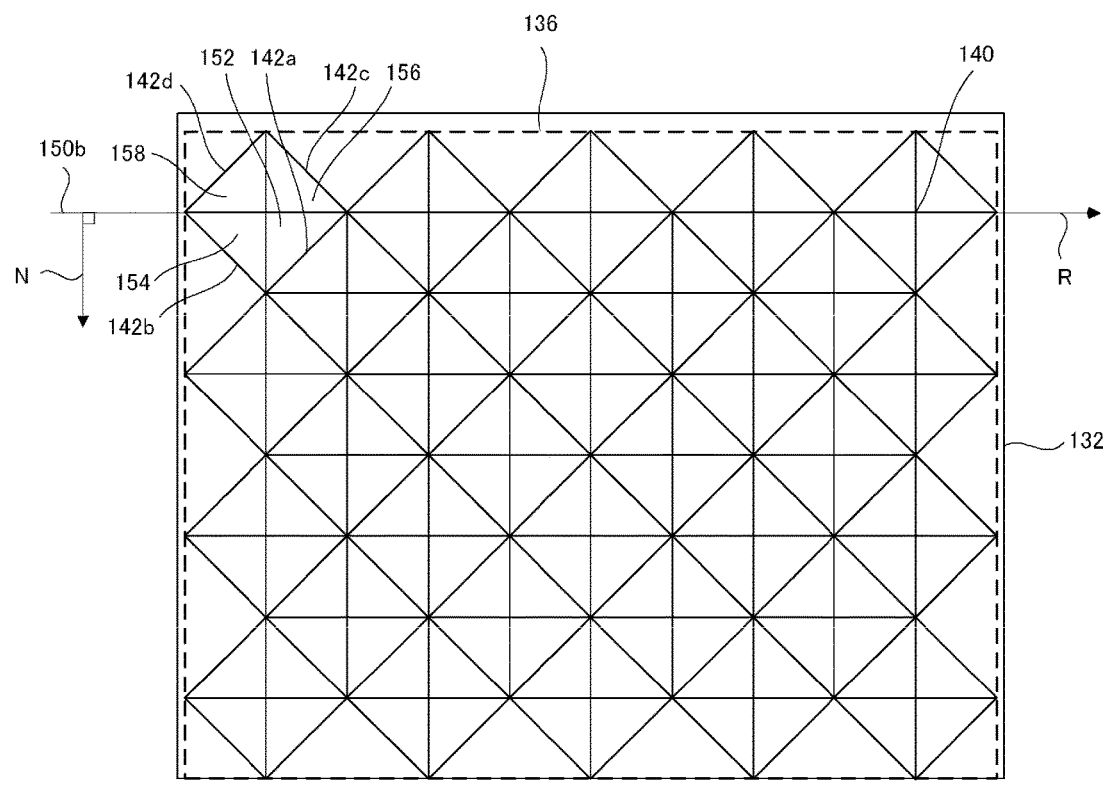
FIG. 5 is a plan view illustrating a scattering portion according to the example according to the present invention.

As illustrated in FIGS. 4, 5, and 7, the surface 152 that includes the edge 142a of the bottom surface 142 of the square pyramid 140, and the surface 154 that includes the edge 142b of the bottom surface 142, when the top surface 132 of the bottom step part 126 is viewed in the plan view, are positioned on the imaging direction N side of the imaging device 110, relative to the second vertical plane 150b that sections the square pyramid 140. Consequently, the surface 152 and the surface 154 of the square pyramid 140 are surfaces that are positioned on the imaging direction N side of the imaging device 110. Note that the second vertical plane 150a is positioned at a corner on the imaging direction N side of the imaging device 110.

The surface 152 and the surface 154 of the square pyramid 140 are positioned so that the diagonal line 144 of the bottom surface 142 of the square pyramid 140 is parallel to the imaging direction N of the imaging device 110, when the top surface 132 of the bottom step part 126 is viewed in the plan view, and thus is inclined relative to the first vertical plane 148 and the second vertical plane 150a. Moreover, the surface 152 and the surface 154 of the square pyramid 140 are inclined in mutually opposing directions relative to the first vertical plane 148. Furthermore, the surface 152 and the surface 154 of the square pyramid 140 are each inclined in directions wherein the top ends thereof mutually approach each other, relative to a plane (not shown) that is perpendicular to the top surface 132 of the bottom step part 126 that includes the respective edges 142a and 142b.

The surface 156, in the square pyramid 140, that includes the edge 142c of the bottom surface 142, and the surface 158 that includes the edge 142d of the bottom surface 142, when the top surface 132 of the bottom step part 126 is viewed in the plan view, are positioned on the opening portion 130 side of the case 120 in relation to the second vertical plane 150b. Consequently, the surface 156 and the surface 158 of the square pyramid 140 are surfaces that are positioned on the opening portion 130 side of the case 120.

The various square pyramids 140, as illustrated in FIG. 5, are disposed, in the direction R that is perpendicular to the imaging direction N of the imaging device 110, with the corners of the bottom surfaces 142 contacting each other. Moreover, the arrays of square pyramids 140 in the direction R are arrayed in the imaging direction N of the imaging device 110, shifted with each by one-half of a square pyramid 140 in the imaging direction N of the imaging device 110 and in the direction of R. In adjacent arrays in the direction R, the edges 142a and the edges 142d in the bottom surface 142 are in contact with the edges 142b and the edges 142c.

Figure 6:
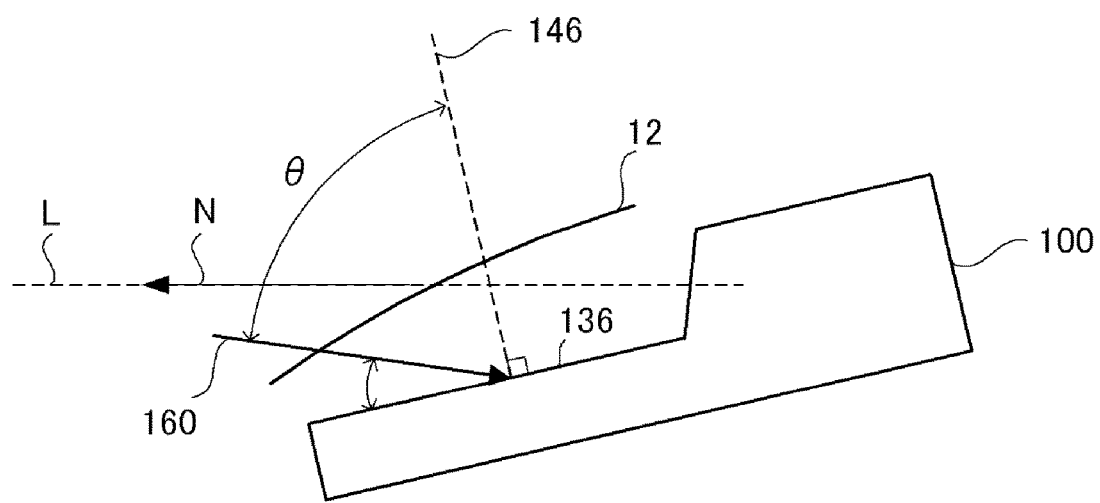
FIG. 6 is a schematic diagram for explaining the incident light that is incident into the imaging unit according to the example according to the present invention.

FIG. 6 and FIG. 7 will be referenced next to explain the reflections of light by the square pyramid 140, when the top surface 132 of the bottom step part 126 is viewed in the plan view.

As illustrated in FIG. 6, when incident light 160 that is parallel to the first vertical plane 148 that is angled with an angle θ (0°<θ<90°) away from the vertical axis 146 toward the imaging direction N of the imaging device 110 is incident into the scattering portion 136, the incident light 160 is incident into the square pyramid 140 as well.

Of the incident light 160 that is incident into the square pyramid 140, the incident light 160 that is incident onto the surface 152 of the square pyramid 140 is reflected in a direction that is inclined relative to the first vertical plane 148, as illustrated in FIG. 7, because the surface 152 is inclined relative to the first vertical plane 148 and the second vertical plane 150a.

Moreover, the incident light 160 that is incident onto the surface 154 of the square pyramid 140, in the same manner as with the incident light 160 that is incident onto the surface 152, is reflected in a direction that is inclined relative to the first vertical plane 148.

The surface 152 and the surface 154 of the square pyramid 140 are inclined in mutually opposing directions relative to the first vertical plane 148. Consequently, the incident light 160 that is incident onto the surface 152 of the square pyramid 140 and the incident light 160 that is incident onto the surface 154 of the square pyramid 140 will be reflected in mutually differing directions that are inclined relative to the first vertical plane 148 when the top surface 132 of the bottom step part 126 is viewed in the plan view.

The top surface 132 of the bottom step part 126 of the case 120 faces the windshield 12 of the vehicle 10. Consequently, most of the parallel light from above, which is at an angle relative to the top surface 132 of the bottom step part 126, which has passed through the windshield 12, that is, the incident light 160, is incident into the scattering portion 136 that is provided on the top surface 132 of the bottom step part 126.

In the present example, when the top surface 132 of the bottom step part 126 is viewed in the plan view, the surface 152 and the surface 154 of the square pyramid 140 will reflect, in mutually differing directions that are inclined relative to the first vertical plane 148, the incident light 160, of which the majority is incident on the top surface 132 of the bottom step part 126. This enables the imaging unit 100 to reduce the light that is reflected by the top surface 132 of the bottom step part 126 and is incident into the opening portion 130, of the case 120, that is perpendicular to the first vertical plane 148.

In this way, the imaging unit 100 reduces the light that is reflected by the top surface 132 of the bottom step part 126 and is incident into the opening portion 130. This enables the imaging unit 100 to reduce the light that is reflected by the top surface 132 of the bottom step part 126 and is incident into the imaging lens 112.

Moreover, as with the surface 152 and the surface 154 of the square pyramid 140, the surface 156 and the surface 158 of the square pyramid 140 are also able to reflect the incident light 160 in mutually differing directions relative to the first vertical plane 148. The result is the ability for the imaging unit 100 to reduce further the light that is reflected by the top surface 132 of the bottom step part 126 and is incident into the imaging lens 112.

While, in the above example, the diagonal lines 144 of the bottom surface 142 of the square pyramids 140 and the imaging direction N of the imaging device 110 were arranged in parallel when the top surface 132 of the bottom step part 126 was viewed in the plan view, the arrangement of the square pyramids 140 is not limited thereto.

Figure 9:
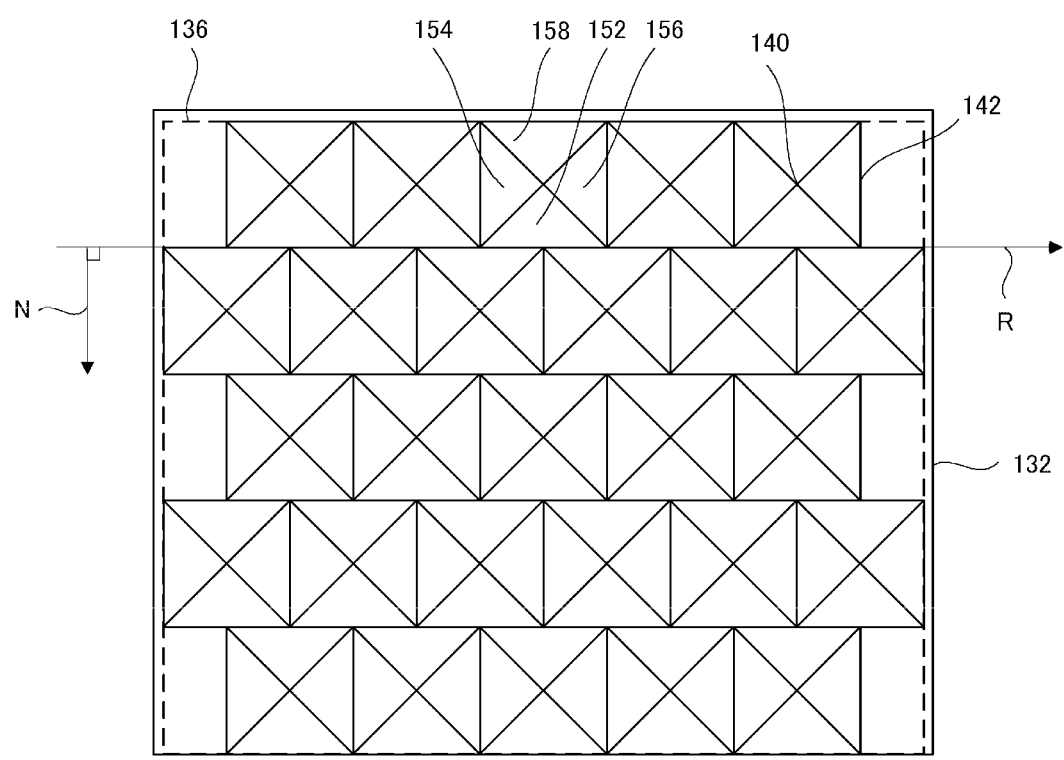
FIG. 9 is a plan view illustrating a scattering portion according to the other example according to the present invention.
Figure 10:
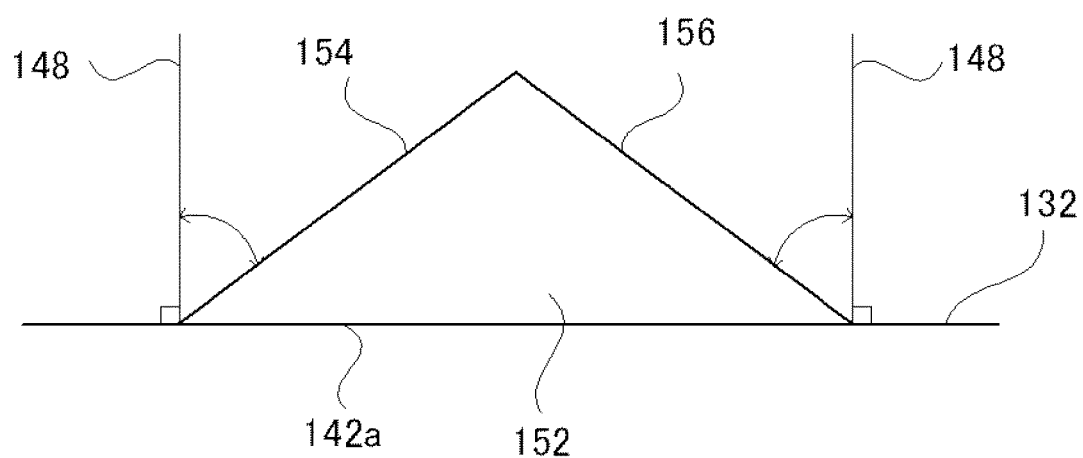
FIG. 10 is a schematic diagram for explaining the slopes of the surfaces of a square pyramid in a case wherein the top surface of the bottom stage part of a case according to the other example according to the present invention is viewed, in cross-section, from the imaging direction.

An imaging unit 100 according to the present example will be explained in reference to FIG. 8 through FIG. 12. Note that, for ease in understanding, only a single square pyramid 140 is shown in FIGS. 8, 10, and 11.

Figure 8:
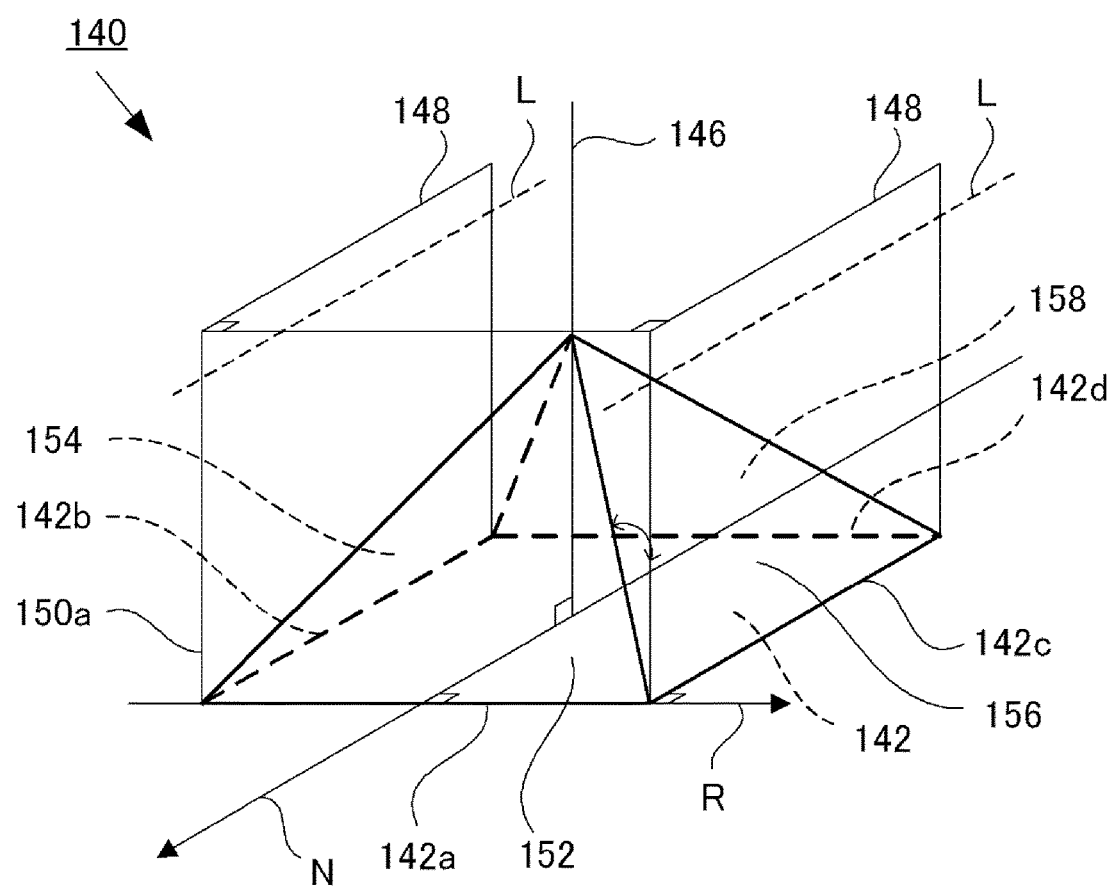
FIG. 8 is a perspective diagram illustrating a square pyramid for structuring a scattering portion according to another example according to the present invention.

As illustrated in FIG. 8, each of the square pyramids 140 is arranged so that, when the top surface 132 of the bottom step part 126 is viewed in the plan view, the edge 142a of the bottom surface 142 is parallel with the direction R that is perpendicular to the imaging direction N of the imaging device 110. Moreover, the square pyramids 140 are arrayed in the form of a matrix, shifted by one-half pitch with each array in the direction R, as illustrated in FIG. 9. The other structures are the same as in the above example.

Because the edge 142a of the bottom surface 142 of the square pyramid 140 is arranged so as to be parallel to the direction R, the surface 154 and the surface 156 of the square pyramid 140 are perpendicular to the second vertical plane 150a. Moreover, as illustrated in FIG. 10, the surface 154 and the surface 156 of the square pyramid 140, when the top surface 132 of the bottom step part 126 is viewed in a cross-sectional view from the imaging direction N of the imaging device 110, are inclined, in relation to the first vertical plane 148, in directions wherein the top ends mutually approach each other.

Figure 11:
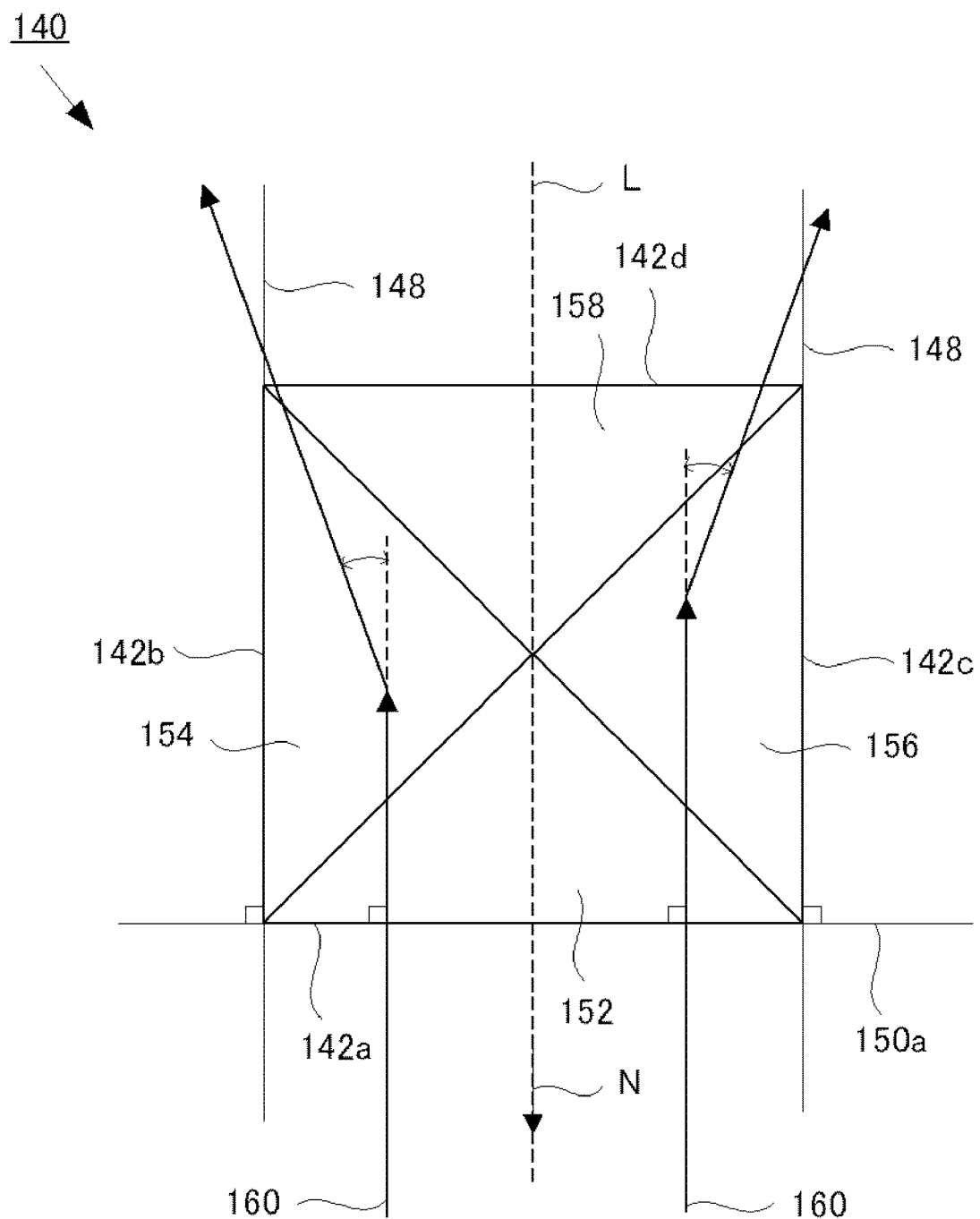
FIG. 11 is a plan view for explaining reflections in the square pyramid according to the other example according to the present invention.

In the same manner as in the above example, when the incident light 160 is incident into the scattering portion 136, the incident light 160 that is incident onto the surface 154 is reflected in a direction that is inclined in relation to the first vertical plane 148, as illustrated in FIG. 11, because the surface 154 is inclined relative to the first vertical plane 148, when the top surface 132 of the bottom step part 126 is viewed in a cross-sectional view.

Moreover, the incident light 160 that is incident onto the surface 156 as well, in the same manner as with the incident light 160 that is incident onto the surface 154, is reflected in a direction that is inclined relative to the first vertical plane 148.

When the top surface 132 of the bottom step part 126 is viewed in a cross-sectional view, the surface 154 and the surface 156 are inclined, relative to the first vertical plane 148, in directions wherein the top ends thereof approach each other, and thus the incident light 160 that is incident onto the surface 154 and the incident light 160 that is incident onto the surface 156 are reflected in mutually differing directions that are inclined relative to the first vertical plane 148, when the top surface 132 of the bottom step part 126 is viewed in a cross-sectional view.

As described above, as in the above example, when the top surface 132 is viewed in a plan view, the square pyramid 140 reflects the incident light 160 in mutually differing directions that are inclined relative to the first vertical plane 148. Consequently, the imaging unit 100 in the present example is also able to reduce the light that is incident into the opening portion 130 through being reflected on the top surface 132, that is, the light that is incident into the imaging lens 112 through being reflected by the top surface 132.

The results of optical simulations of the ratio of brightness of the incident light 160 that is incident into the opening portion 130 of the case 120, in relation to the brightness of the incident light 160 that is incident onto the top surface 132 (the scattering portion 136) of the bottom step part 126 will be explained next.

Figure 12:
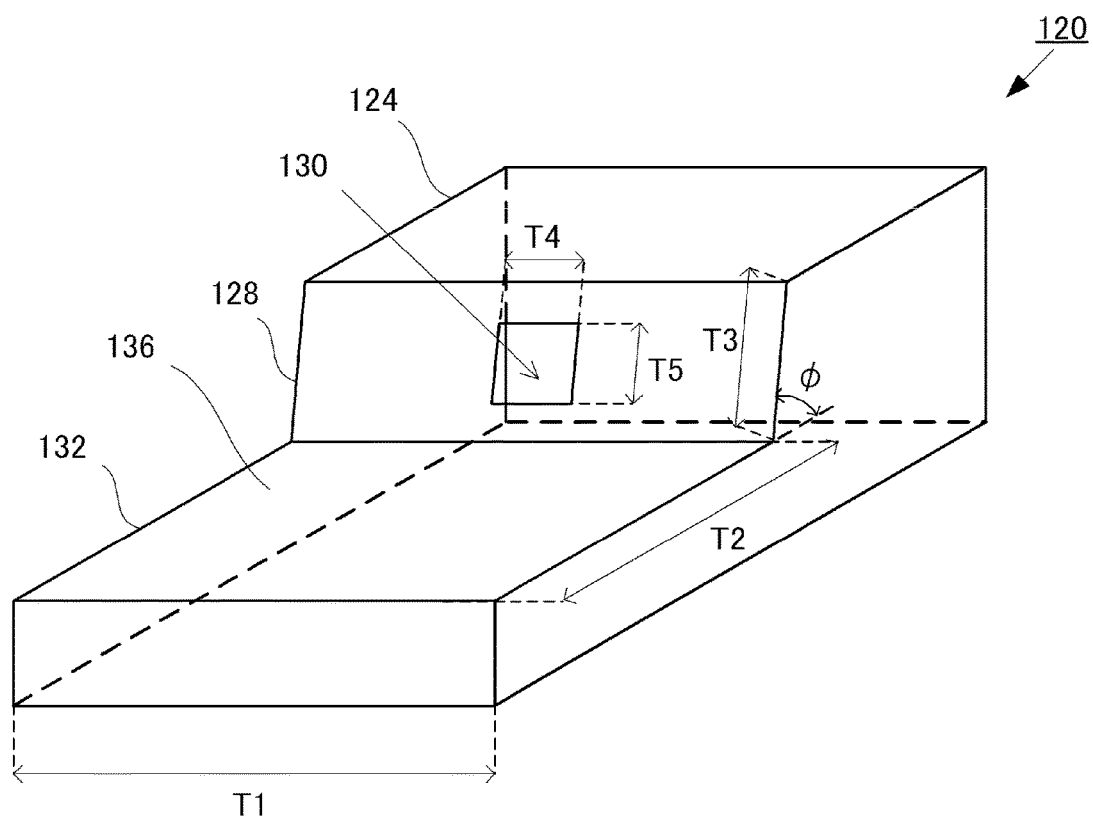
FIG. 12 is a perspective diagram illustrating the case used in the optical simulations according to the other example according to the present invention.

In the optical simulation, as illustrated in FIG. 12, 50 mm was used as the width T1 of the top surface 132 of the bottom step part 126, 20 mm was used as the depth T2, and 15 mm was used as the length T3 of the height direction of the stepped side surface 128. Moreover, 60° was used for the angle φ of the stepped side surface 128 relative to the top surface 132, 15 mm was used as the width T4 of the opening portion 130 that is provided in the center of the stepped side surface 128, and 12 mm was used as the length T5 in the height direction thereof.

Moreover, the square pyramids 140 were arranged in the form of a matrix, the same as in FIG. 9, or the entire surface of the top surface 132. In the square pyramid 140, 2 mm was used for the lengths of the edges 142a, 142b, 142c, and 142d of the bottom surface 142, and 1 mm was used for the height.

For such a case 120, incident light 160 that is inclined at an angle θ=75° toward the imaging direction N of the imaging device 110 from the vertical axis 146 that is perpendicular to the top surface 132 was directed in the vicinity of the center of the top surface 132. The light source for emitting the incident light 160 was a circular light source, with a diameter of 2 mm, a size wherein the incident light 160 is not blocked by the frame that supports the windshield 12. Moreover, the reflectivity of the square pyramid 140 was 100%.

Under the conditions set forth above, commercially available beam tracing simulation software was used to simulate the proportion of brightness of the incident light 160 that was incident on the opening portion 130, relative to the brightness of the incident light 160 that was incident on the top surface 132.

As a reference example, the same simulation was performed for a case wherein the scattering portion 136 was not provided on the top surface 132. The case in the reference example was identical to the case 120, except for not being provided with the scattering portion 136 (the square pyramids 140). The incident light 160 that was incident onto the case in the reference example was identical to the incident light 160 that was incident onto the case 120. Note that the reflectivity of the top surface 132 was 100%.

The result of the optical simulations was that, with the case 120, 1.0% of the incident light 160 was incident into the opening portion 130, where in the reference example 100% of the incident light 160 was incident into the opening portion of the case.

That is, it was demonstrated by the optical simulations that the provision of the scattering portion 136, structured from square pyramids 140, on the top surface 132 reduced the light that is reflected from the top surface 132 and incident into the opening portion 130.

As described above, the imaging unit 100 according to the present example enables a reduction in the light that is reflected by the top surface 132 and is incident into the imaging lens 112.

While in the above example the scattering portion 136 was structured from a plurality of square pyramids 140, the structural units for structuring the scattering portion 136 are not limited thereto.

Figure 13:
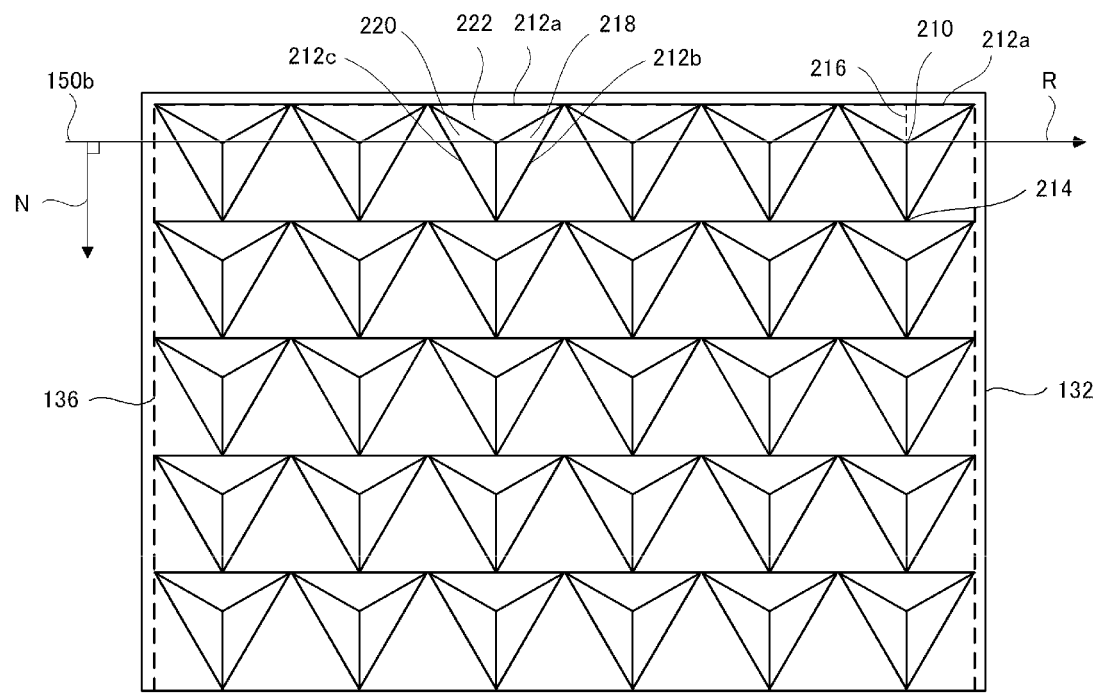
FIG. 13 is a plan view illustrating a scattering portion according to a father example according to the present invention.
Figure 14:
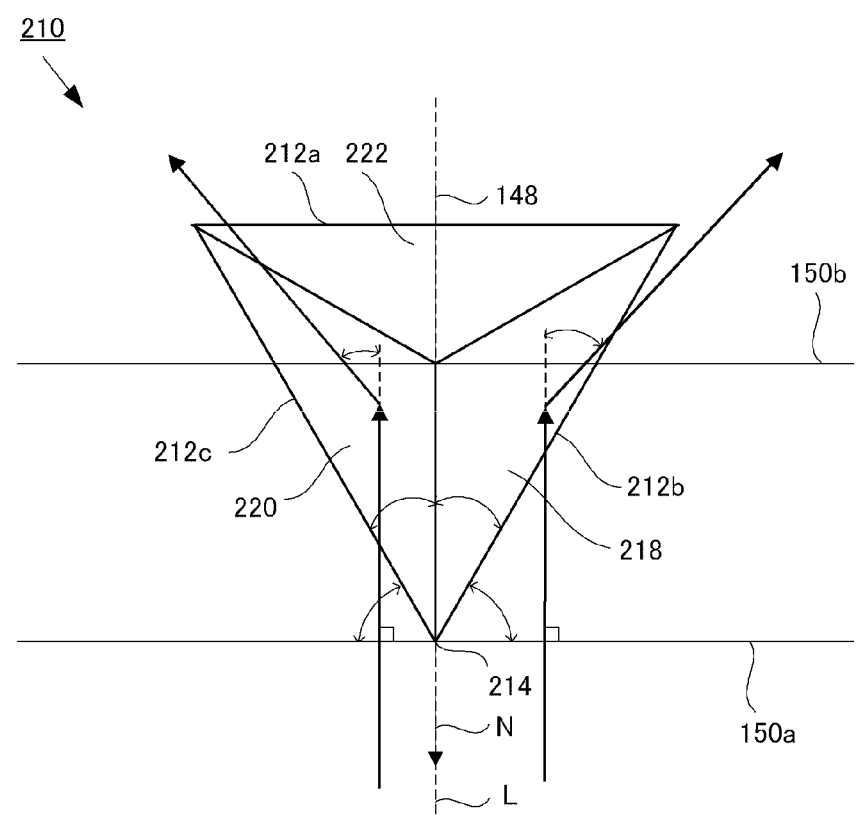
FIG. 14 is a plan view for explaining reflections in the triangular pyramid according to the further example according to the present invention.

As illustrated in FIGS. 13 and 14, in the present example the scattering portion 136 is structured from a plurality of triangular pyramids 210. The other structures are the same as in the above example.

Note that, for ease in understanding, only a single triangular pyramid 210 is shown in FIG. 14.

Each of the triangular pyramids 210 has a triangular bottom surface (not shown). As illustrated in FIG. 13 and FIG. 14, when the top surface 132 of the bottom step part 126 is viewed in the plan view, the individual triangular pyramids 210 are arranged so that the perpendicular line 216 from the corner 214 of the bottom surface to the edge 212a of the bottom surface that opposes the corner 214 is parallel to the imaging direction N of the imaging device 110.

The corner 214 of the bottom surface of the triangular pyramid 210 is positioned toward the imaging direction N side of the imaging device 110, and the edge 212a of the bottom surface of the triangular pyramid 210 is positioned toward the opening portion 130 side of the case 120.

As illustrated in FIG. 13 and FIG. 14, when the top surface 132 of the bottom step part 126 is viewed in the plan view, the surface 218 of the triangular pyramid 210 that includes the edge 212b of the bottom surface of the triangular pyramid 210 is positioned toward the imaging direction N side of the imaging device 110, relative to a second vertical plane at 150b that cuts across the triangular pyramid 210, and thus is the surface that is positioned on the imaging direction N side of the imaging device 110. Moreover, the surface 220 of the triangular pyramid 210 that includes the edge 212c of the bottom surface of the triangular pyramid 210 is also a surface that is positioned toward the imaging direction N side of the imaging device 110, in the same manner as with the surface 218. Note that in the bottom surface of the triangular pyramid 210, the edge 212b and the edge 212c have the corner 214 of the bottom surface of the triangular pyramid 210 therebetween.

The surface 222 that includes the edge 212a of the bottom surface of the triangular pyramid 210 is positioned toward the opening portion 130 side of the case 120, relative to the second vertical plane 150b, when the top surface 132 of the bottom step part 126 is viewed in the plan view, and thus is the surface that is positioned on the opening portion 130 side of the case 120.

Moreover, the surface 218 and the surface 220 of the triangular pyramid 210 are arranged so that the perpendicular line 216 of the triangular pyramid 210 and the imaging direction N of the imaging device 110 are parallel, and thus are inclined relative to the first vertical plane 148 and the second vertical plane 150a. Moreover, the surface 218 and the surface 220 are inclined in mutually opposing directions relative to the first vertical plane 148. The surface 218 and the surface 220 are inclined in directions so that the top ends thereof approach each other, relative to the planes (not shown) that are perpendicular to the top surface 132 of the bottom step part 126, and that include, respectively, the edges 212*b* and 212*c*.

The individual triangular pyramids 210 are arranged, as illustrated in FIG. 13, in the form of a matrix in the imaging direction N of the imaging device 110 and the direction R. In triangular pyramids 210 that are adjacent in the imaging direction N of the imaging device 110, the edges 212*a* of the bottom surfaces and the corners 214 of the bottom surfaces contact each other. Moreover, in the triangular pyramids 210 that are adjacent in the direction R, one end each of the edges 212*a* of the bottom surfaces touch each other.

The incident light 160 that is incident on the surface 218 when the incident light 160 is incident on the scattering portion 136 is reflected in a direction that is inclined relative to the first vertical plane 148, when the top surface 132 is viewed in the plan view, as illustrated in FIG. 14, because the surface 218 is inclined relative to the first vertical plane 148 and the second vertical plane 150*a*.

Moreover, the incident light 160 that is incident on the surface 220, as with the incident light 160 that is incident on the surface 218, is reflected in a direction that is inclined relative to the first vertical plane 148, when the top surface 132 is viewed in the plan view.

Because the surface 218 and the surface 220 are inclined, relative to the first vertical plane 148, a mutually opposing directions, the incident light 160 that is incident on the surface 218 and the incident light 160 that is incident on the surface 220 are reflected in mutually differing directions that are inclined relative to the first vertical plane 148, when the top surface 132 is viewed in the plan view.

As described above, when the top surface 132 is viewed in the plan view, the triangular pyramid 210 reflects the incident light 160 in mutually differing directions that are inclined relative to the first vertical plane 148. Consequently, in the same manner as in the above example, the imaging unit 100 is able to reduce the light that is incident into the opening portion 130 through reflection on the top surface 132. This enables the imaging unit 100 to reduce the light that is reflected by the top surface 132 and is incident into the imaging lens 112.

While in the above examples the scattering portions 136 were structured from pyramids, the structural units for structuring the scattering portion 136 are not limited thereto.

Figure 15:
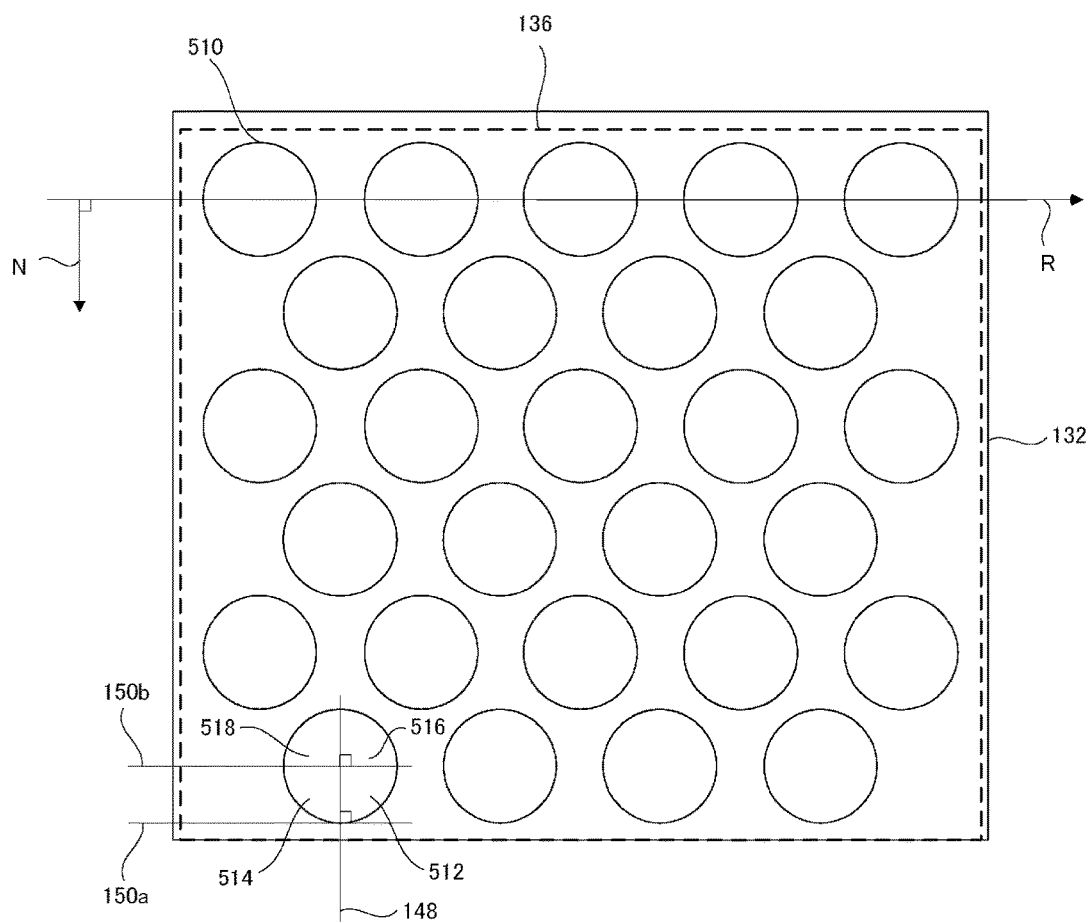
FIG. 15 is a plan view illustrating a scattering portion according to a yet further example according to the present invention.
Figure 16:
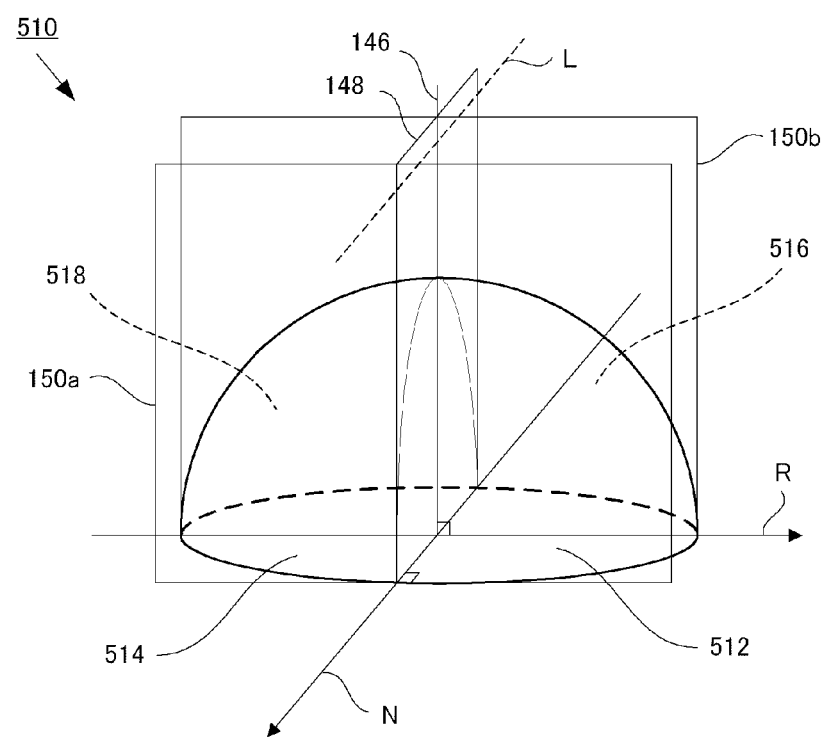
FIG. 16 is a perspective diagram illustrating a hemisphere for structuring a scattering portion according to the yet further example according to the present invention.
Figure 17:
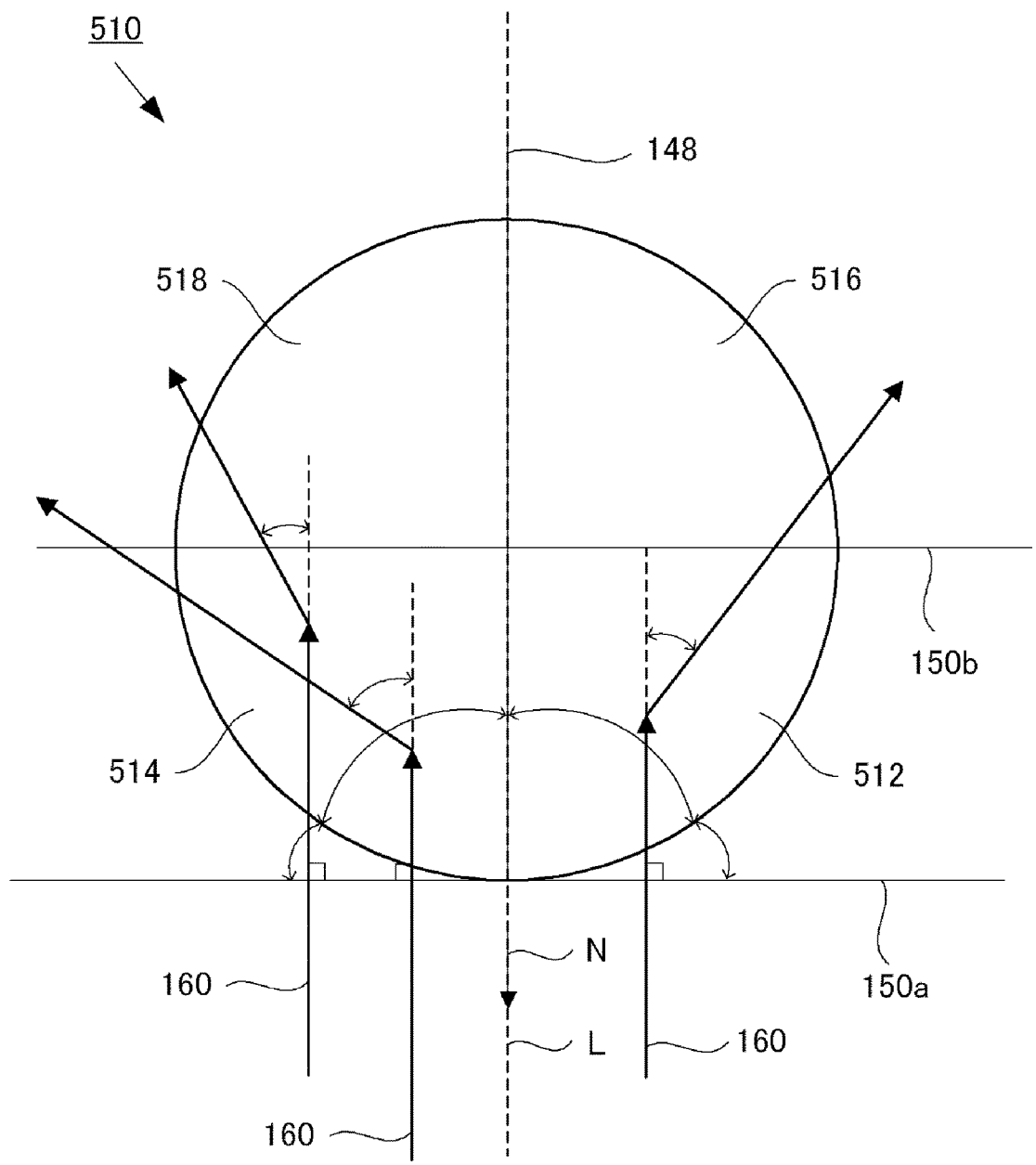
FIG. 17 is a plan view for explaining reflections in the hemisphere according to the yet further example according to the present invention.

In the present example, as illustrated in FIGS. 15 through 17, the scattering portion 136 is structured from a plurality of hemispheres 510. The other structures are the same as in the above examples. Note that, for ease in understanding, only a single hemisphere 510 is shown in FIGS. 16 and 17.

The hemispheres 510 are arrayed in the form of a matrix, shifted by one-half pitch with each array in the direction R, as illustrated in FIG. 15. In this case, as illustrated in FIG. 16, the hemispheres 510 are divided into quarters by the first vertical plane 148 and the second vertical plane 150*b* that cut across the hemisphere 510. The surface of the hemisphere 510 is structured from four surfaces 512, 514, 516, and 518.

Note that the second vertical plane 150*a* is in contact with the bottom surface (not shown) of the hemisphere 510, on the imaging direction N side of the imaging device 110.

When the top surface 132 of the bottom step part 126 is viewed in the plan view, the surface 512 and the surface 514 are positioned toward the imaging direction N the side of the imaging device 110 relative to the second vertical plane 150*b* that sections the hemisphere 510. Consequently, the surface 512 and the surface 514 are surfaces that are positioned toward the imaging direction N side of the imaging device 110. Moreover, because the bottom surface of the hemisphere 510 is a circle, the surface 512 and the surface 514 are inclined relative to the first vertical plane 148 and the second vertical plane 150*a*, in mutually opposing directions, relative to the first vertical plane 148. Moreover, the surface 512 and the surface 514 are each inclined, in directions so that the top ends thereof approach each other, relative to a plane (not shown) that is perpendicular to the top surface 132, and that includes the arcs that are positioned on the top surface 132.

The incident light 160 that is incident on the surface 512 when the incident light 160 is incident on the scattering portion 136 is reflected in a direction that is inclined relative to the first vertical plane 148, as illustrated in FIG. 17, because the surface 512 is inclined relative to the first vertical plane 148 and the second vertical plane 150*a*. The incident light 160 that is incident onto the surface 514 as well, in the same manner as with the incident light 160 that is incident onto the surface 512, is reflected in a direction that is inclined relative to the first vertical plane 148.

Because the surface 512 and the surface 514 are inclined, relative to the first vertical plane 148, a mutually opposing directions, the incident light 160 that is incident on the surface 512 and the incident light 160 that is incident on the surface 514 are reflected in mutually differing directions that are inclined relative to the first vertical plane 148, when the top surface 132 is viewed in the plan view.

As described above, when the top surface 132 is viewed in the plan view, the hemisphere 510 reflects the incident light 160 in mutually differing directions that are inclined relative to the first vertical plane 148. Consequently, in the same manner as in the above examples, the imaging unit 100 according to the present example is able to reduce the light that is incident into the opening portion 130 through reflection on the top surface 132. Through this, the imaging unit 100 according to the present example enables a reduction in the light that is reflected by the top surface 132 and is incident into the imaging lens 112.

Moreover, because the surface 512 and the surface 514 are both curved surfaces, the incident light 160 that is incident at different positions, as illustrated in FIG. 17, is reflected at different angles relative to the first vertical plane 148. Through this, the light that is incident into the opening portion 130, reflected by the top surface 132, can be reduced even further by the imaging unit 100 according to the present example.

As with the surface 512 and the surface 514, the surface 516 and the surface 518 that are positioned on the opening portion 130 side of the case 120 can also reflect the incident light 160 in mutually differing directions that are inclined relative to the first vertical plane 148. Moreover, the incident light 160 that is incident at different positions on the surface 516 and the surface 518, in the same manner as with the surface 512 and the surface 514, can be reflected at mutually differing angles relative to the first vertical plane 148. As a result, the imaging unit 100 in the present example is able to reduce further the light that is reflected by the top surface 132 and is incident into the opening portion 130.

An optical simulation was carried out on the case 120 wherein hemispheres 510 with a radius of 1 mm were disposed on the top surface 132 in the form of a matrix, in the same manner as in FIG. 15. In this optical simulation, a result was obtained wherein 0.02% of the incident light 160 was incident into the opening portion 130.

While in certain above examples the scattering portions 136 were structured from pyramids, the structural units for structuring the scattering portion 136 are not limited thereto.

Figure 18:
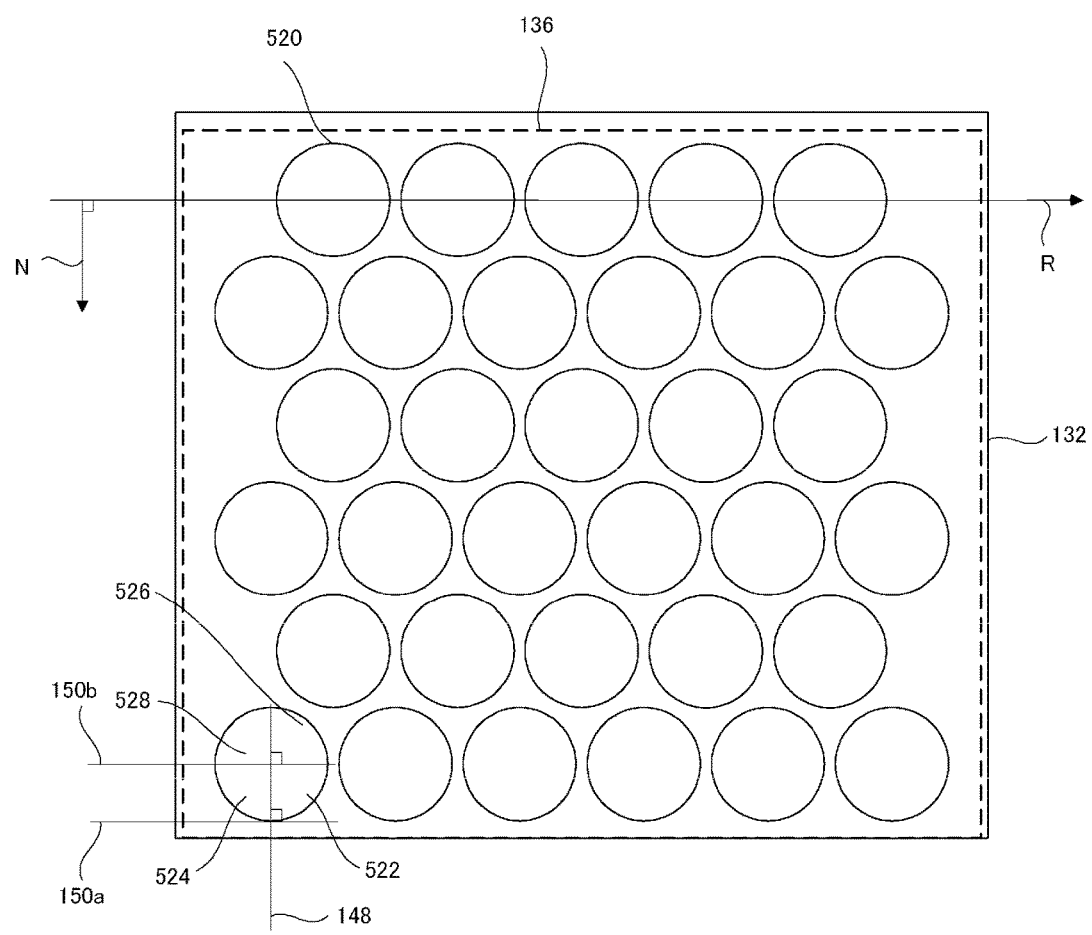
FIG. 18 is a plan view illustrating a scattering portion according to an additional example according to the present invention.
Figure 19:
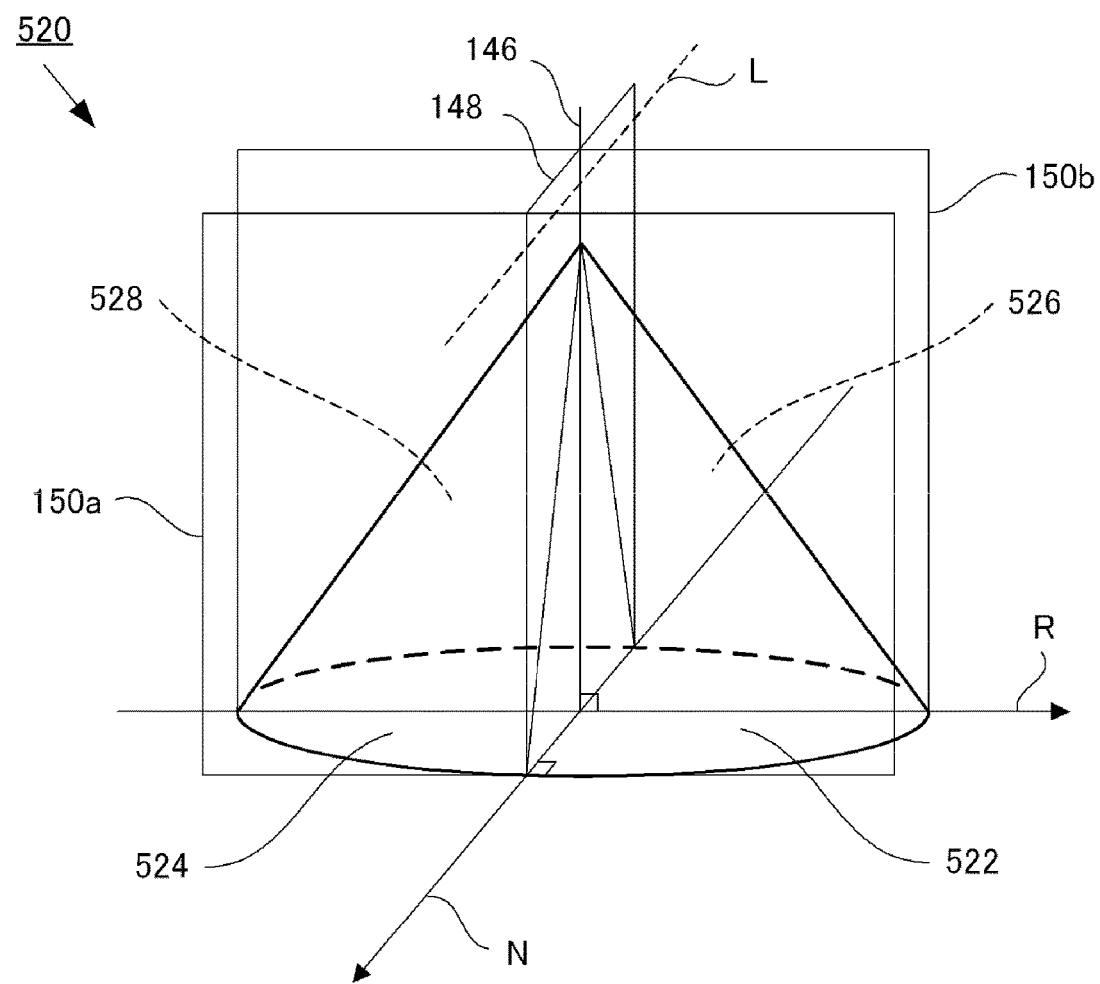
FIG. 19 is a perspective diagram illustrating a cone for structuring a scattering portion according to the additional example according to the present invention.
Figure 20:
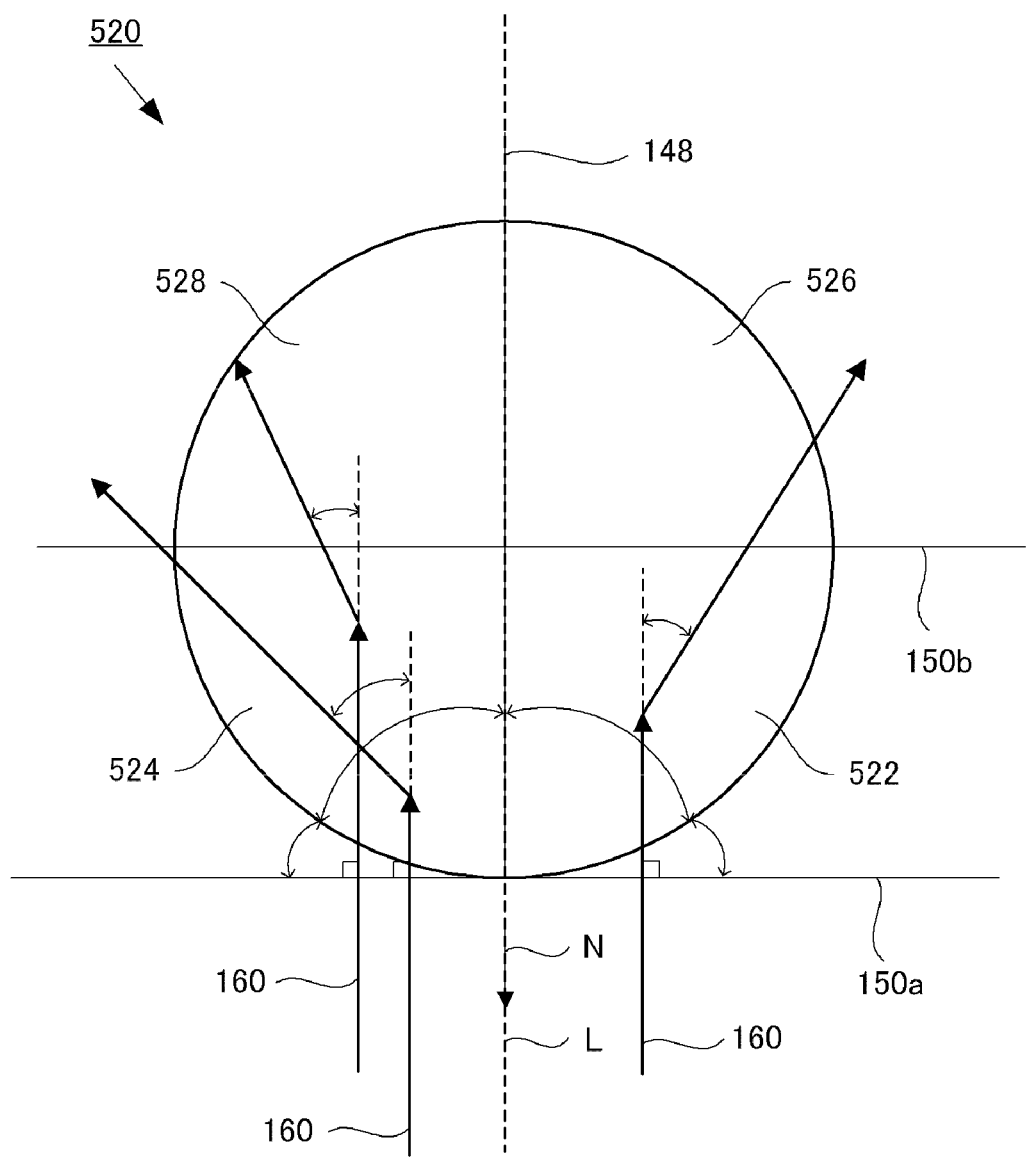
FIG. 20 is a plan view for explaining reflections in the cone according to the additional example according to the present invention.

In the present example, as illustrated in FIGS. 18 through 20, the scattering portion 136 is structured from a plurality of cones 520. The other structures are the same as in the above examples. Note that, for ease in understanding, only a single cone 520 is shown in FIGS. 19 and 20.

The cones 520 are arrayed in the form of a matrix, shifted by one-half pitch with each array in the direction R, as illustrated in FIG. 18. In this case, as illustrated in FIG. 19, the cone 520 is divided into quarters by the first vertical plane 148 and the second vertical plane 150b that cut across the cone 520. The surface of the cone 520 is structured from four surfaces 522, 524, 526, and 528.

Note that the second vertical plane 150a is in contact with the bottom surface (not shown) of the cone 520, on the imaging direction N side of the imaging device 110.

When the top surface 132 of the bottom step part 126 is viewed in the plan view, the surface 522 and the surface 524 are positioned toward the imaging direction N the side of the imaging device 110 relative to the second vertical plane 150b that sections the cone 520, and thus are surfaces that are positioned toward the imaging direction N side of the imaging device 110. Moreover, because the bottom surface of the cone 520 is a circle, the surface 522 and the surface 524 are inclined relative to the first vertical plane 148 and the second vertical plane 150a, in mutually opposing directions, relative to the first vertical plane 148. Moreover, the surface 522 and the surface 524 are each inclined, in directions so that the top ends thereof approach each other, relative to a plane (not shown) that is perpendicular to the top surface 132 of the bottom step part 126, and that includes the arcs that are positioned on the top surface 132.

Because the surface 522 and the surface 524 are inclined in mutually opposite directions relative to the first vertical plane 148, when the incident light 160 is incident on the scattering portion 136, the cones 520 reflected the incident light 160 in mutually different directions, inclined relative to the first vertical plane 148, when the top surface 132 is viewed in the plan view, as illustrated in FIG. 20. As a result, the imaging unit 100 in the present example is also able to reduce further the light that is reflected by the top surface 132 and is incident into the opening portion 130 of the case 120. Through this, the imaging unit 100 according to the present example enables a reduction in the light that is reflected by the top surface 132 and is incident into the imaging lens 112.

Moreover, because the surface 522 and the surface 524 are curved surfaces, the incident light 160 that is incident at different positions, as illustrated in FIG. 20, is reflected at different angles relative to the first vertical plane 148. Consequently, in the same manner as in the some examples above, the imaging unit 100 according to the present example is also able to reduce further the light that is incident into the opening portion 130 of the case 120 through reflection on the top surface 132.

Moreover, as with the surface 522 and the surface 524, the surface 526 and the surface 528 that are positioned on the opening portion 130 side of the case 120 can also reflect the incident light 160 in mutually differing directions that are inclined relative to the first vertical plane 148. Moreover, the incident light 160 that is incident at different positions on the surface 526 and the surface 528, in the same manner as with the surface 522 and the surface 524, can be reflected at mutually differing angles relative to the first vertical plane 148. As a result, the imaging unit 100 in the present example is able to reduce further the light that is reflected by the top surface 132 and is incident into the opening portion 130.

An optical simulation was carried out on the case 120 wherein cones 520 with a bottom-surface radius of 1 mm and a height of 1 mm were disposed on the top surface 132 in the form of a matrix, in the same manner as in FIG. 18. In this optical simulation, a result was obtained wherein 0.001% of the incident light 160 was incident into the opening portion 130.

While in certain above examples the surfaces 152, 154, 218, 220, 512, 514, 522, and 524, which are positioned toward the imaging direction N side of the imaging device 110, were inclined relative to a plane that is perpendicular to the top surface 132, the surfaces positioned toward the imaging direction N side of the imaging device 110 may instead be perpendicular to the top surface 132.

In the present example, the scattering portion 136 is structured from a plurality of circular columns 530. The other structures are the same as in the above examples.

Figure 21:
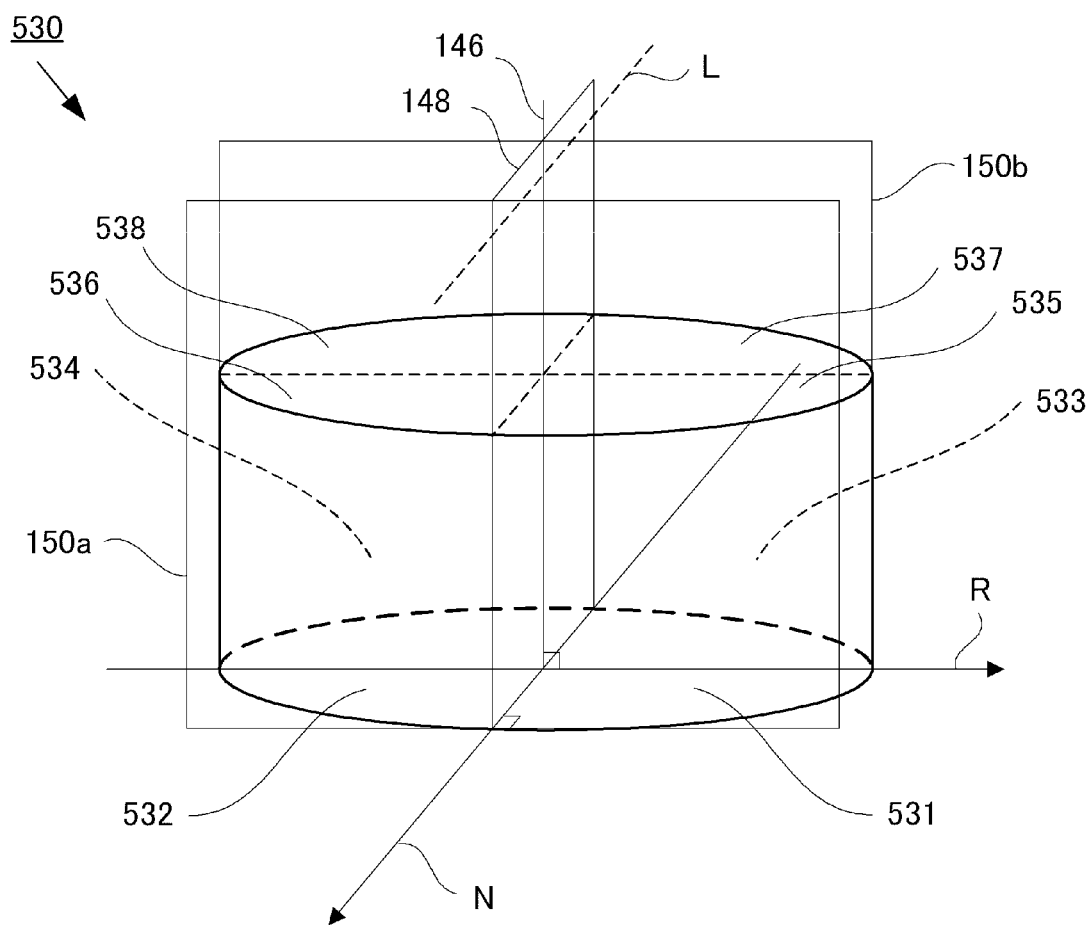
FIG. 21 is a perspective diagram illustrating a circular column for structuring a scattering portion according to an example according to the present invention.

The circular columns 530 are arrayed, in the form of a matrix, in the same manner as with the certain above examples, with the array in the direction R shifted with a half pitch with each array. In this case, as illustrated in FIG. 21, the circular columns 530 are divided into quarters by the first vertical plane 148 and the second vertical plane 150b that cut across the circular column 530. The surface of the circular column 530 is structured from eight surfaces 531, 532, 533, 534, 535, 536, 537, and 538. The surface 531 and the surface 532 are positioned toward the imaging direction N side of the imaging device 110. Surface 531 and surface 532 are surfaces that are perpendicular to the top surface 132 of the bottom step part 126. Moreover, surface 533 and surface 534 are positioned on the opening portion 130 side of the case 120. Surface 533 and surface 534 are surfaces that are perpendicular to the top surface 132 of the bottom step part 126.

Note that surfaces 535 and 536, which are positioned on the imaging direction N side of the imaging device 110, and surfaces 537 and 538 that are positioned on the opening portion 130 side of the case 120, are surfaces that are parallel to the top surface 132 of the bottom step part 126.

Figure 22:
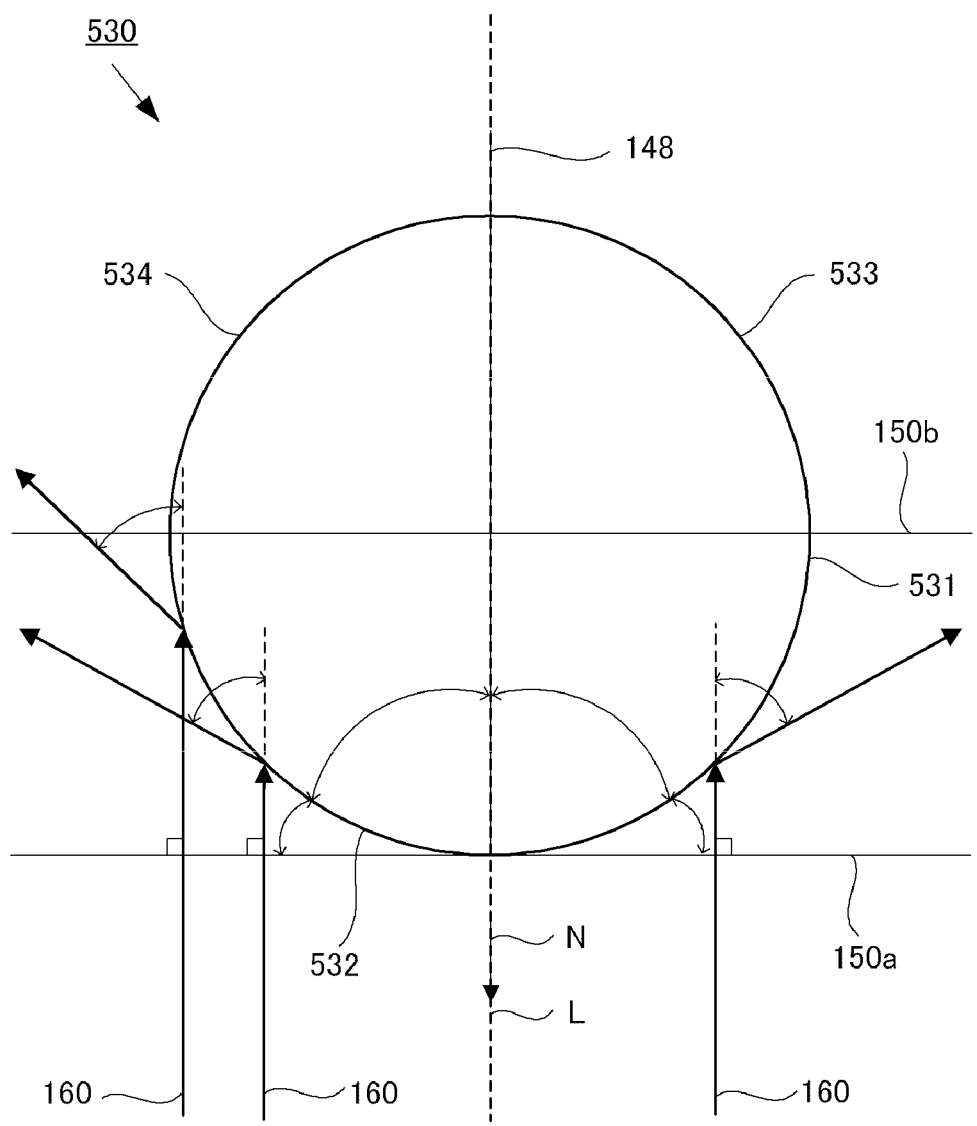
FIG. 22 is a plan view for explaining reflections in the circular column according to the example according to the present invention.

Because the bottom surface of these circular column 530 is a circle, the surface 531 and the surface 532, in the same manner as in cwertain above examples, are inclined relative to the first vertical plane 148 and the second vertical plane 150a. Moreover, the surface 531 and the surface 532 are inclined in mutually opposing directions relative to the first vertical plane 148. Consequently, when the incident light 160 is incident on the scattering portion 136, the circular column 530 reflects the incident light 160 in mutually differing directions that are inclined relative to the first vertical plane 148, when the top surface 132 is viewed in the plan view, as illustrated in FIG. 22.

Moreover, the surface 531 and the surface 532 are both curved surfaces, and thus the incident light 160 that is incident at different positions is reflected at different angles relative to the first vertical plane 148.

Through this, in the same manner as in the above examples, the imaging unit 100 according to the present example is also able to reduce the light that is incident into the opening portion 130 of the case 120 through reflecting on the top surface 132, enabling a reduction in the light that is incident into the imaging lens 112 through reflecting on the top surface 132.

An optical simulation was carried out on the case 120 wherein circular columns 530 with a bottom-surface radius of 1 mm and a height of 1 mm were disposed on the top surface 132 in the form of a matrix, in the same manner as in FIG. 18. In this optical simulation, a result was obtained wherein 12.6% of the incident light 160 was incident into the opening portion 130.

While in certain above examples the scattering portions 136 were structured from pyramids, the scattering portions 136 may be structured instead from truncated pyramids instead. In the present example, the scattering portion 136 is structured from a plurality of truncated square pyramids 540. The other structures are the same as in the above examples.

Figure 23:
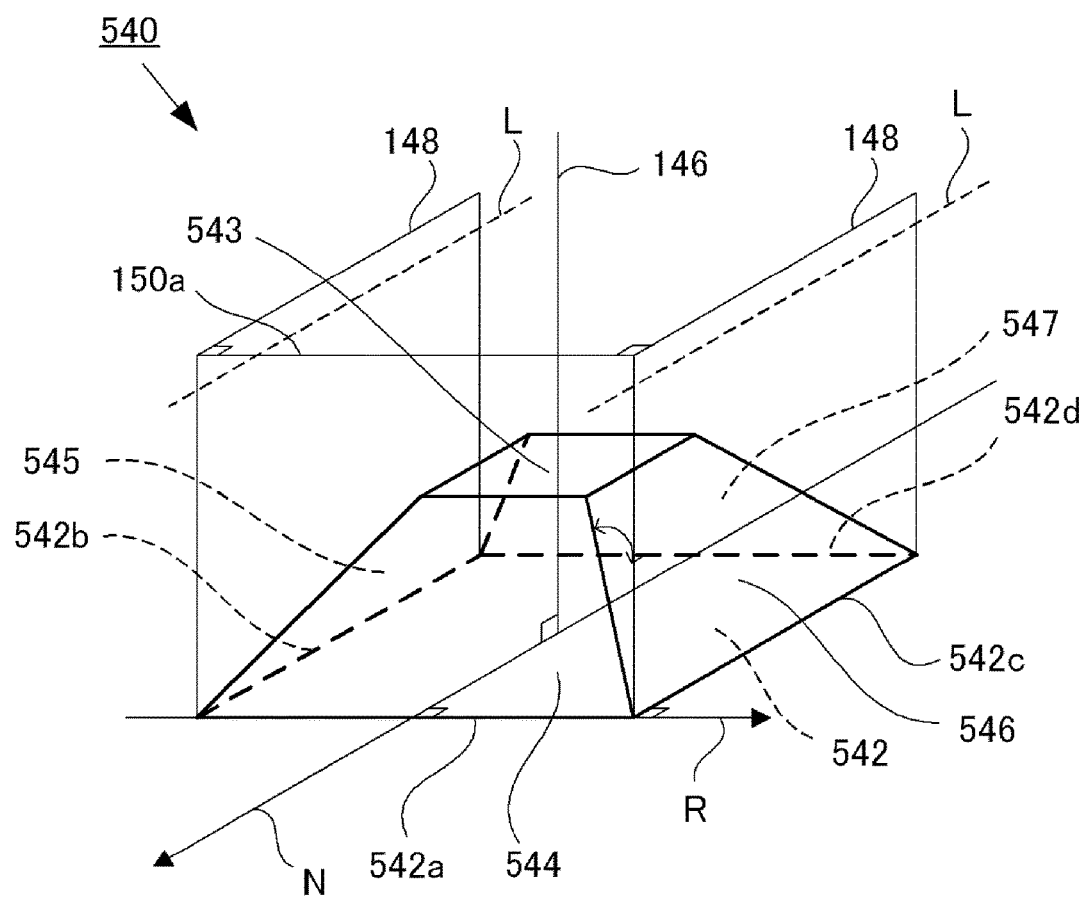
FIG. 23 is a perspective diagram illustrating a truncated square pyramid for structuring a scattering portion according to another example according to the present invention.

As illustrated in FIG. 23, the truncated square pyramid 540 has a square bottom surface 542 and top surface 543. The truncated square pyramid 540, in the same manner as with the certain above exampoles, is arranged so that the edge 542a of the bottom surface 542 is parallel with the direction R, when the top surface 132 of the bottom step part 126 is viewed in the plan view. In the same manner as in the above examples, the truncated square pyramids 540 are arrayed in the form of a matrix, shifted by one-half pitch with each array in the direction R.

Figure 24:
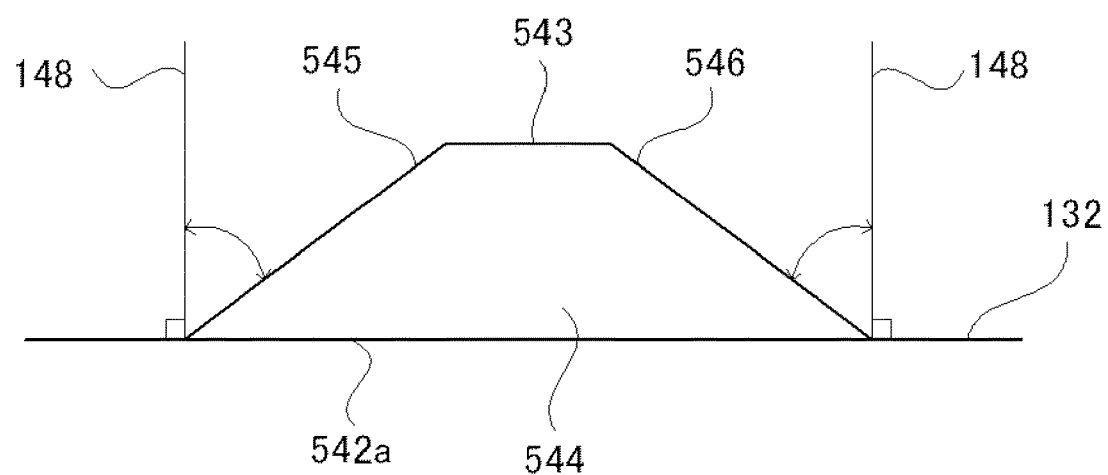
FIG. 24 is a schematic diagram for explaining the slopes of the surfaces of a truncated square pyramid in a case wherein the top surface of the bottom stage part of a case according to the other example according to the present invention is viewed, in cross-section, from the imaging direction.

In this case, the surface 545 that includes the edge 542b of the bottom surface 542, and the surface 546 that includes the edge 542c of the bottom surface 542 are perpendicular to the second vertical plane 150a. Moreover, as illustrated in FIG. 24, the surface 545 and the surface 546, when the top surface 132 is viewed in a cross-sectional view from the imaging direction N of the imaging device 110, are inclined, in relation to the first vertical plane 148, in directions wherein the top ends mutually approach each other.

Note that the top surface 543 of the truncated square pyramid 540 is connected to the surface 545 and the surface 546. The surface 544 that includes the edge 542a of the bottom surface 542, and the surface 547 that includes the edge 542d of the bottom surface, are perpendicular to the first vertical plane 148.

Because when the top surface 132 is viewed in a cross-sectional view from the imaging direction N of the imaging device 110, the surface 545 and the surface 546 are inclined in directions wherein the top ends thereof approach each other, relative to the first vertical plane 148, when the incident light 160 is incident onto the scattering portion 136, the truncated square pyramid 540 reflects the incident light 160 in mutually differing directions that are inclined relative to the first vertical plane 148, when the top surface 132 is viewed in the plan view.

As a result, the imaging unit 100 in the present example is also able to reduce further the light that is reflected by the top surface 132 and is incident into the opening portion 130 of the case 120. Through this, the imaging unit 100 according to the present example enables a reduction in the light that is reflected by the top surface 132 and is incident into the imaging lens 112.

An optical simulation was carried out on the case 120 wherein truncated square pyramids 540 were disposed on the top surface 132 in the form of a matrix, in the same manner as in FIG. 9. Here, in the truncated square pyramid 540, the length of one edge of the bottom surface 542 was 2 mm, the height was 0.55 mm, and the length of one edge of the top surface 543 was 0.9 mm. In this optical simulation, a result was obtained wherein 10.1% of the incident light 160 was incident into the opening portion 130.

While in all of the above examples the scattering portion 136 was provided on the top surface 132 of the bottom step part 126 of the case 120, the surface on which the scattering portion 136 is provided is not limited thereto.

Figure 25:
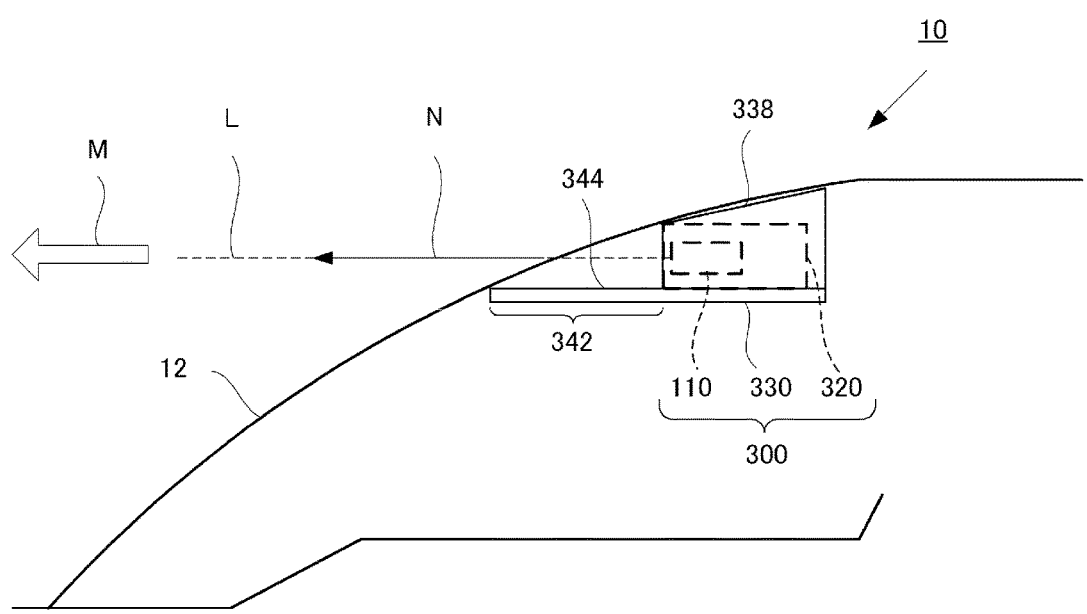
FIG. 25 is a schematic diagram depicting an imaging unit, and a vehicle provided with an imaging unit, as set forth in a further example according to the present invention.

As illustrated in FIG. 25, in the present example the imaging unit 300 comprises an imaging device 110, a case 320 for enclosing the imaging device 110, and an attaching portion 330. Note that the structure of the imaging device 110 is the same as in the above examples.

The case 320 is secured to a windshield 12 of a vehicle 10 through an attaching portion 330. In this case, the imaging direction N of the imaging device 110 and the optical axis L of the imaging lens 112 are matched to the direction of travel M of the vehicle 10. Note that the securing of the case of 320 is described below.

Figure 26:
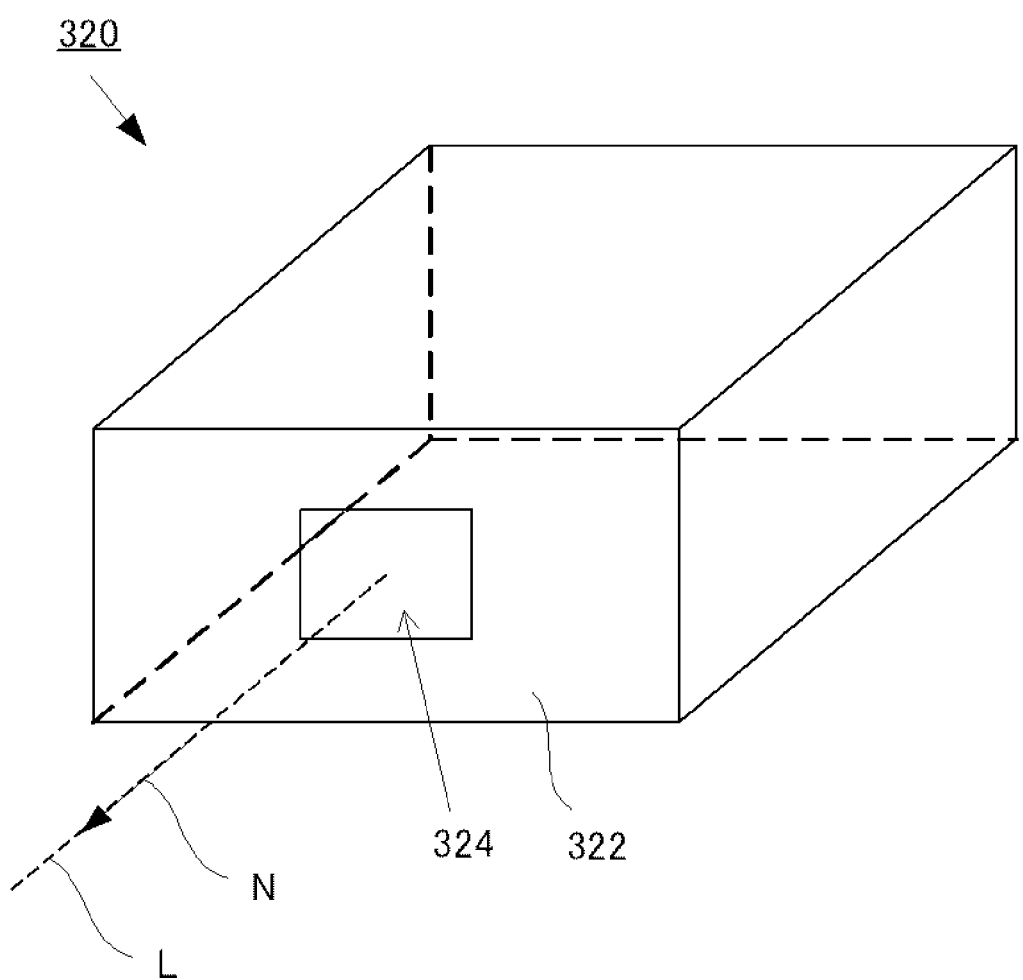
FIG. 26 is a perspective diagram illustrating a case according to a further example according to the present invention.

As illustrated in FIG. 26, the case 320 has a box-like shape. The case 320 has an opening portion 324 in a side surface 322. The opening portion 324 of the case 320, in the same manner as with the opening portion 130 of the case 120 in the certain above exampoles, passes light that is to be incident into the imaging lens 112 of the imaging device 110 from an imaging object.

The case 320 is made out of a metal, such as die cast aluminum, die cast magnesium, or the like. The case 320 is blackened.

The imaging device 110 is enclosed in the case 320, with the optical axis L of the imaging lens 112 facing the opening portion 324, in a state wherein the optical axis L of the imaging lens 112 is parallel to the case of 320.

Figure 27:
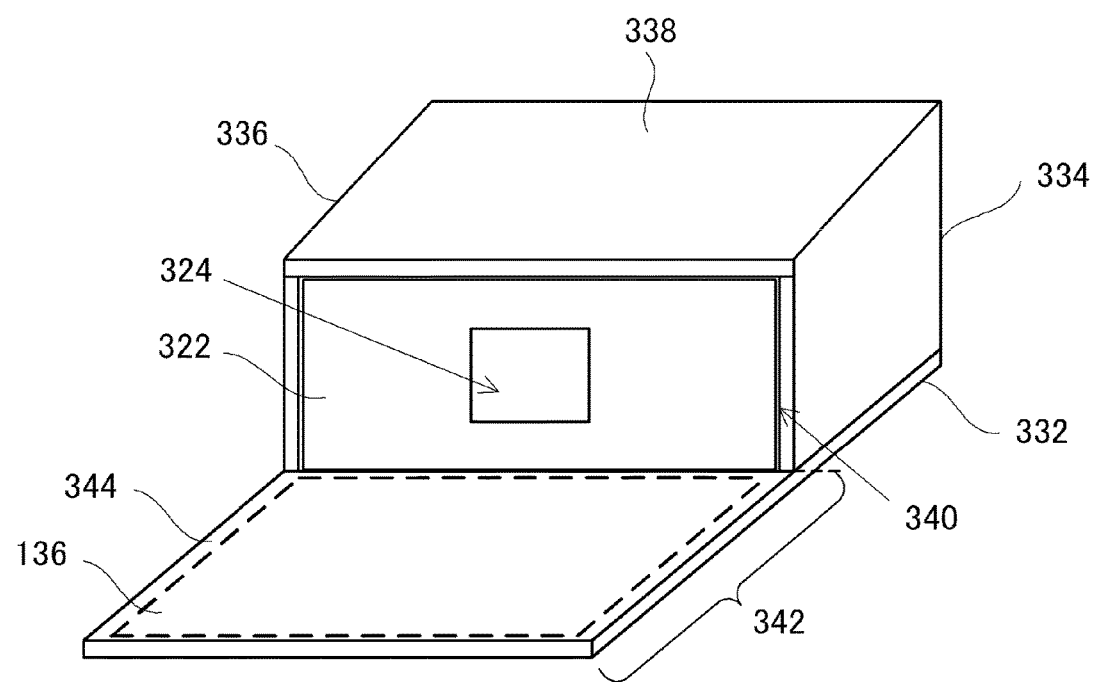
FIG. 27 is a perspective diagram illustrating an attaching portion according to a further example according to the present invention.

As illustrated in FIG. 27, the attaching portion 330 has a bottom plate 332, on which the case 320 is provided, side plates 334 and 336, and a top plate 338. The attaching portion 330 is made from a metal, such as die cast aluminum or die cast magnesium. The attaching portion 330 is blackened.

The side plate 334 and the side plate 336 are each connected to respective end portions that face the bottom plate 332. The top plate 338 connects the end portions, of the side plate 334 and the side plate 336, on the opposite ends as the end portions that are connected respectively to the bottom plate 332. The top plate 338 is inclined matching the incline of the windshield 12 of the vehicle 10.

The bottom plate 332 comprises an extending portion 342 that extends from an opening portion 340 that is formed from the bottom plate 332, the side plates 334 and 336, and the top plate 338. The case 320 is secured to the bottom plate 332 in a state wherein the side surface 322, which has an opening portion 324, is fitted into the opening portion 340 of the attaching portion 330. The case 320 is secured to the bottom plate 332 of the attaching portion 330 through, for example, screws, or the like.

Because the side surface 322 of the case 320 is fitted into the opening portion 340 of the attaching portion 330, the extending portion 342 of the attaching portion 330 extends from the opening portion 324 of the case 320. Moreover, the imaging device 110 is enclosed in the case 320 with the optical axis L of the imaging lens 112 facing the opening portion 324 of the case 320, and the extending portion 342 of the attaching portion 330 extends in the imaging direction N of the imaging device 110.

In the present example, the scattering portion 136 is provided on the first extending surface 344 of the extending portion 342. The first extending surface 344 is the surface of the extending portion 342 on the optical axis L side of the imaging lens 112. The scattering portion 136 that is provided on the first extending surface 344 is structured from, for example, a plurality of square pyramids 140, in the same manner as in the above examples.

The securing of the case 320 to the windshield 12 of the vehicle 10 will be explained. The case 320 is secured to the windshield 12 through bonding, to the windshield 12 of the vehicle 10, the top plate 338 of the attaching portion 330, to which the case 320 is secured. In this case, the extending portion 342 of the attaching portion 330 faces the direction of travel M the vehicle 10, and the direction of travel M of the vehicle 10, the imaging direction N of the imaging device 110, and the optical axis L of the imaging lens 112 are caused to be coincident.

In the present example, the top plate 338 of the attaching portion 330 is inclined matching the incline of the windshield 12 of the vehicle 10, enabling the case 320 to be secured to the windshield 12 of the vehicle 10 in a state wherein the case 320 is parallel to the road surface. Moreover, because it is not necessary for the optical axis L of the imaging lens 112 of the imaging device 110 to be inclined relative to the case 320, the imaging device 110 can be arranged easily within the case 320.

Moreover, in the same manner as in the above examples, the scattering portion 136 is provided on the first extending surface 344 that is positioned on the optical axis L side of the imaging lens 112. Consequently, this imaging unit 300 is also able to reduce the light that is reflected by the first extending surface 344 of the attaching portion 330 and is incident into the opening portion 324 of the case 320. Through this, the imaging unit 300 is able to reduce the light that is reflected from the first extending surface 344 that is incident into the imaging lens 112.

The present invention is not limited to the examples set forth above, but rather may be varied in a variety of ways.

For example, the imaging unit 100 or 300 may be provided on the rear windshield, a side window, the ceiling, or the like, instead of the windshield 12 of the vehicle 10. Here the vehicle 10 may be a passenger vehicle, such as an automobile, a train, or the like, or may be a vehicle for transporting cargo.

Moreover, the imaging unit 100 or 300 may be attached to a vehicle other than a wheeled vehicle 10, such as an airplane, a watercraft, or the like. The attaching of the imaging unit 100 or 300 is not limited to bonding, but rather the imaging unit 100 or 300 may be, for example, attached to the windshield 12 of a vehicle 10, or the like, through a suction cup.

In the imaging device 110, only a portion need be enclosed in the case 120 or 320. For example, the imaging lens 112 of the imaging device 110 may be exposed on the stepped side surface 128 of the case 120 through the opening portion 130. A lens barrel that is provided with the imaging lens 112 of the imaging device 110 may protrude from the opening portion 130 of the case 120. The imaging lens 112 is of the imaging device 110 is not limited to a single lens, but rather may be a plurality of lenses.

Figure 28:
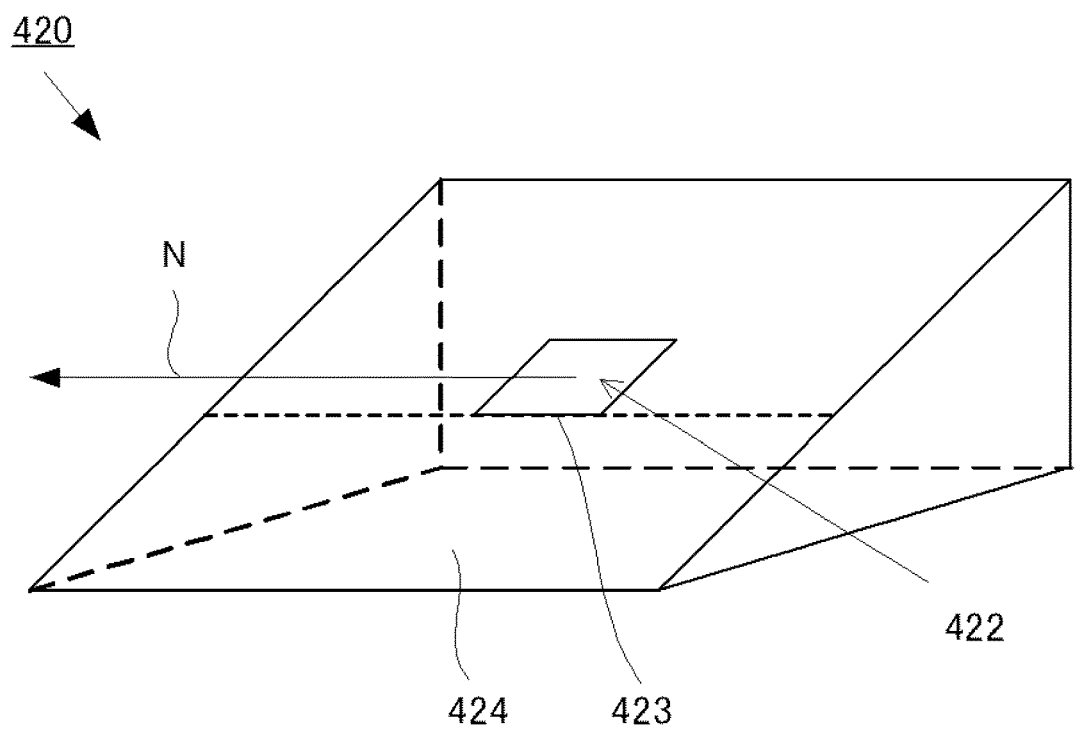
FIG. 28 is a perspective diagram illustrating a modified example of a case according to the present invention.

Moreover, the case 120 or 320 need not be limited to a box-like shape. For example, as depicted in FIG. 28, the case for enclosing the imaging device 110 may be a case 420 that has a triangular cross section. In the case 420, the scattering portion 136 is provided on a surface 424 that extends in the imaging direction N of the imaging device 110 from the bottom end 423 of the opening portion 422 of the case 420.

Figure 29:
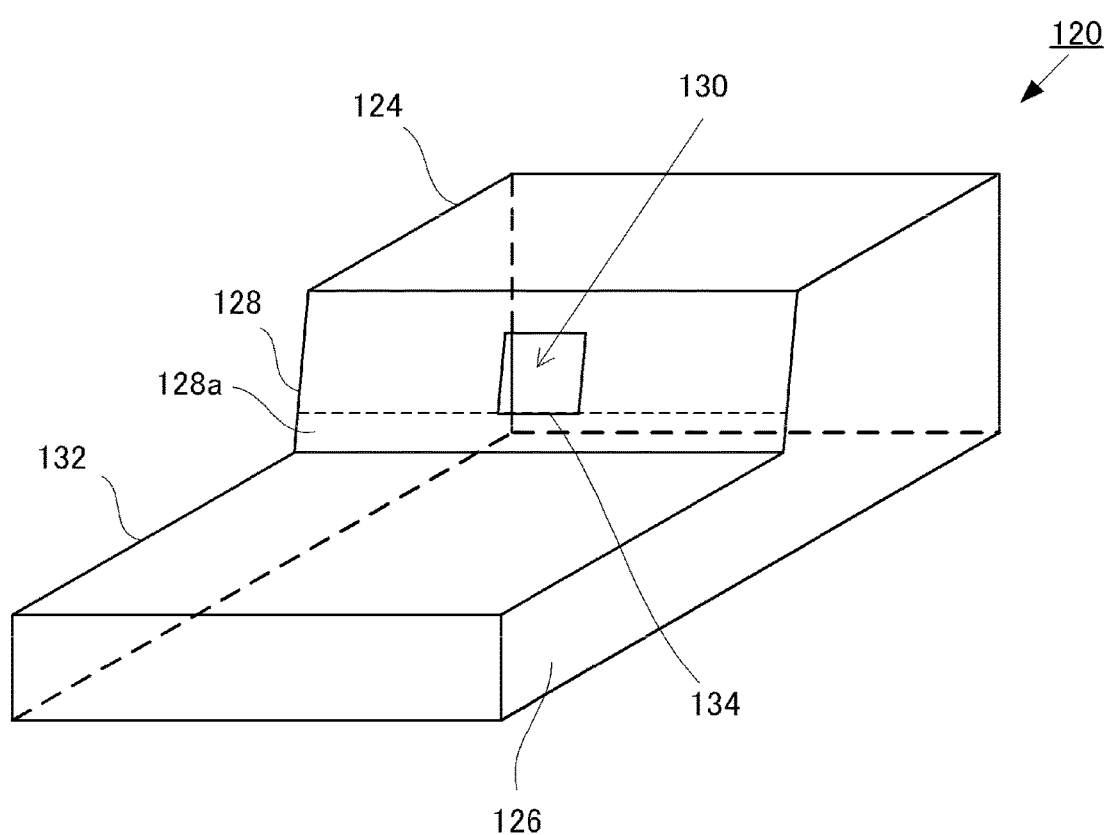
FIG. 29 is a perspective diagram illustrating a modified example of a case according to the present invention.

The scattering portion 136 may instead be provided on a surface 128a that extends to the top surface 132 of the bottom step part 126 from the bottom end 134 of the opening portion 130 in the stepped side surface 128 of the case 120, as illustrated in FIG. 29. The case 120, 320, or 420, and the attaching portion 330, may be formed from a resin such as polycarbonate, ABS (acrylonitrile-butadiene-styrene), or the like.

The scattering portion 136 is not limited to the case 120 or 420, or the attaching portion 330, but rather may instead be provided on a lens hood, or the like.

The structural units for structuring the scattering portion 136 are not limited to the square pyramids 140, the triangular pyramids 210, the cones 520, and so forth. The structural units for structuring the scattering portions 136 in certain examples, may be, for example, a truncated cones 550 instead.

Figure 30:
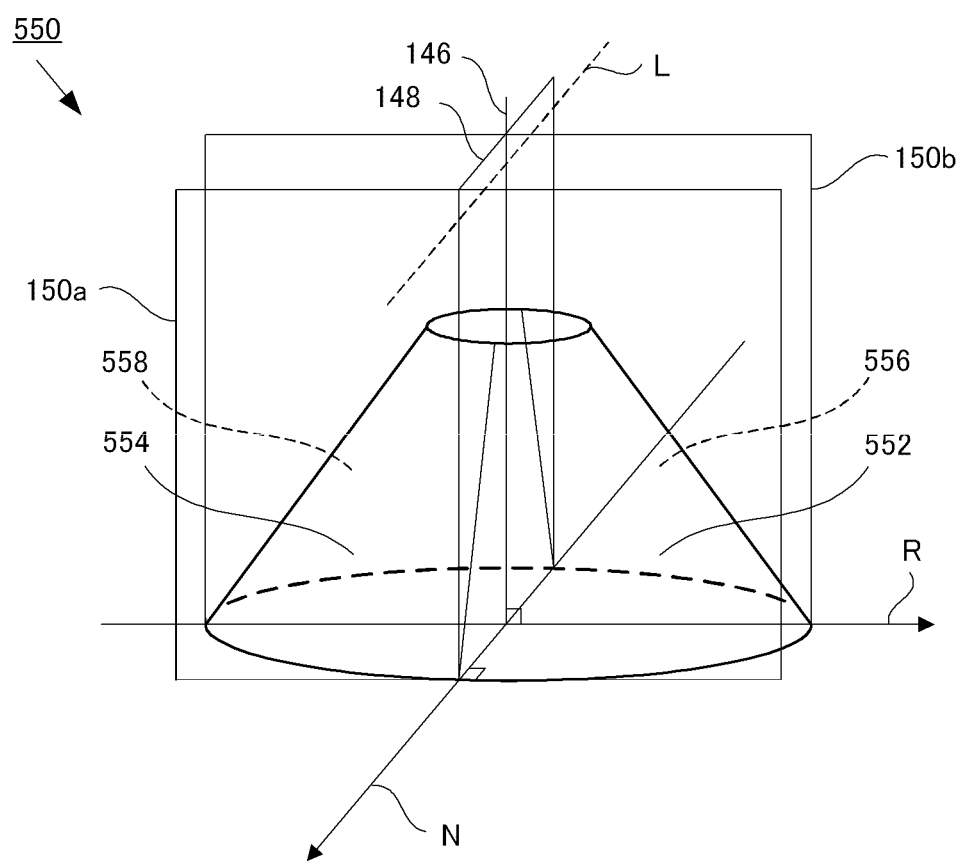
FIG. 30 is a perspective diagram illustrating an example of a truncated cone for structuring a scattering portion according to the present invention.

The truncated cone 550 has a surface 552 and a surface 554. The surface 552 and the surface 554, as illustrated in FIG. 30, are positioned on the imaging direction N side of the imaging device 110, and are inclined in mutually opposing directions relative to the first vertical plane 148. Moreover, the surface 552 and the surface 554 are inclined, in directions wherein the top ends thereof approach each other, relative to a plane (not shown) that is perpendicular to the top surface 132 of the bottom step part 126, and that includes the arcs that are positioned on the top surface 132. Consequently, the truncated cone 550, like the cone 520, is able to reflect the incident light 160 in mutually differing directions, relative to the first vertical plane 148, when the top surface 132 is viewed in the plan view. Moreover, the surface 552 and the surface 554 are curved surfaces, enabling the incident light 160 that is incident at different positions to be reflected at different angles relative to the first vertical plane 148.

As a result, an imaging unit 100 wherein the scattering portion 136 is structured from truncated cones 550 is also able to reduce further the light that is reflected by the top surface 132 and is incident into the opening portion 130 of the case 120. This enables the imaging unit 100 to reduce the light that is reflected by the top surface 132 and is incident into the imaging lens 112.

Moreover, as with the surface 552 and the surface 554, in the truncated cone 550, the surface 556 and the surface 558 that are positioned on the opening portion 130 side of the case 120 can also reflect the incident light 160 in mutually differing directions that are inclined relative to the first vertical plane 148. Moreover, the incident light 160 that is incident at different positions on the surface 556 and the surface 558, in the same manner as with the surface 552 and the surface 554, can be reflected at mutually differing angles relative to the first vertical plane 148. As a result, the imaging unit 100 is able to reduce further the light that is reflected by the top surface 132 and is incident into the opening portion 130 of the case 120.

For example, in an optical simulation, the same as in the certain examples above, for a case 120 wherein truncated cones 550 are arranged on the top surface 132 in the form of a matrix that is the same as in FIG. 18, a result was obtained wherein 3.2% of the incident light 160 was incident into the opening portion 130. Here the radius of the bottom surface of the truncated cone 550 was 1 mm, the height was 0.45 mm, and the radius of the top surface was 0.437 mm.

Moreover, the structural units for structuring the scattering portion 136 in certain examples above, may be truncated rectangular pyramids, n-pyramids (where n is an integer no less than 5), triangular columns that are disposed with prescribed spacing, or the like.

Figure 31:
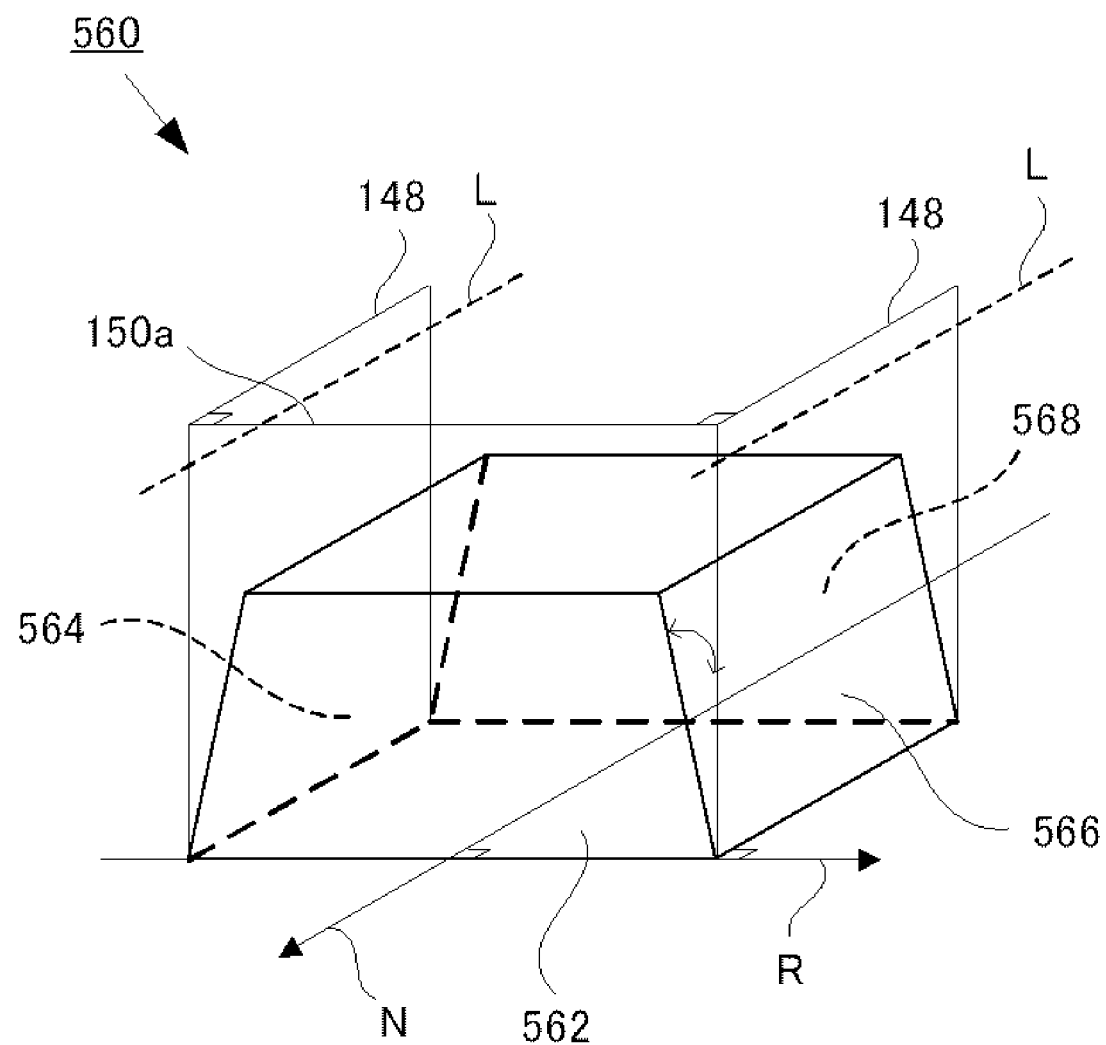
FIG. 31 is a perspective diagram illustrating an example of a truncated rectangular pyramid for structuring a scattering portion according to the present invention.

In certain examples above, the structural units for structuring the scattering portion 136 may be, for example, rectangular truncated pyramids 560 wherein one pair of opposing side surfaces is parallel. In the rectangular truncated pyramid 560, as illustrated in FIG. 31, the side surface 562 and the side surface 568 are parallel. In this case, the side surface 562 and the side surface 568 are arranged so as to be parallel with the second vertical plane 150a. Moreover, the other mutually facing side surface 564 and side surface 566 are perpendicular to the second vertical plane 150a and are inclined so that the top ends thereof approach each other, relative to the first vertical plane 148. Note that the side surface 564 and side surface 566 may be curved surfaces.

Moreover, the arrangement of the structural units for structuring the scattering portion 136 may be irregular instead.

Although an example according to the present invention has been explained above, the present invention is not limited to this example, but rather may be varied in a variety of ways within a range that does not deviate from the spirit or intent of the present invention.

The invention claimed is:

1. An imaging apparatus comprising:
an imaging device comprising an imaging lens;
a case enclosing at least a portion of the imaging device, and the case defining an opening for passing light that is to be incident into the imaging lens of the imaging device from an imaging object; and
an extending surface that extends from the opening of the case in the imaging direction of the imaging device, wherein:
the extending surface is positioned on the optical axis side of the imaging lens;
the extending surface includes a plurality of protrusions; and
each protrusion comprises a surface structure reflecting incident light,
wherein the incident light is parallel to a first vertical plane, wherein the first vertical plane is perpendicular to the extending surface, wherein the first vertical plane extends in the imaging direction of the imaging device,
wherein the incident light forms an acute angle with respect to a vertical axis that is perpendicular to the extending surface,
wherein when the extending surface is viewed in a plan view, the surface structure reflects the incident light in at least two mutually differing directions, wherein each direction is inclined relative to the first vertical plane.

2. The imaging apparatus as set forth in claim 1, wherein:
when a second vertical plane that is perpendicular to the first vertical plane and that is perpendicular to the extending surface is assumed, and the extending surface is viewed in the plan view,
each protrusion comprises, at least, a first surface and a second surface that are positioned toward the imaging direction side of the imaging device, and a surface that is positioned toward the opening, wherein:
the first surface and the second surface are inclined relative to the first vertical plane and the second vertical plane, and are mutually inclined in opposing directions relative to the first vertical plane.

3. The imaging apparatus as set forth in claim 2, wherein:
of the first surface and the second surface, at least one is inclined in a direction wherein the top ends approach each other, relative to a plane that is vertical to the extending surface.

4. The imaging apparatus as set forth in claim 2, wherein:
of the first surface and the second surface, at least one is a curved surface.

5. The imaging apparatus as set forth in claim 2, wherein:
the first surface and the second surface are connected.

6. The imaging apparatus as set forth in claim 2, wherein:
each protrusion exhibits one of pyramids, truncated pyramids, cones, truncated cones, hemispheres, and circular columns.

7. The imaging apparatus as set forth in claim 1, wherein:
when a second vertical plane that is perpendicular to the first vertical plane and that is perpendicular to the extending surface is assumed, and the extending surface is viewed in a cross-sectional view from the imaging direction of the imaging device,
each protrusion has a third surface and a fourth surface that are perpendicular to the second vertical plane, and the third surface and the fourth surface are inclined in directions wherein the top ends thereof approach each other, relative to the first vertical plane.

8. The imaging apparatus as set forth in claim 7, wherein:
the protrusion has a fifth surface that is connected to the third surface and the fourth surface.

9. The imaging apparatus as set forth in claim 7, wherein:
of the third surface and the fourth surface, at least one is a curved surface.

10. The imaging apparatus as set forth in claim 7, wherein:
each protrusion is one of pyramids and truncated pyramids.

11. The imaging apparatus as set forth in claim 1, wherein:
when the extending surface is viewed in the plan view, the protrusions are arrayed in the imaging direction of the imaging device and in the direction that is perpendicular to the imaging direction of the imaging device.

12. The imaging apparatus as set forth in claim 1, wherein:
the extending surface is a surface of the case.

13. The imaging apparatus as set forth in any one of claim 1, comprising:
an attaching portion attaching the case to a vehicle, wherein:
the extending surface is a surface of the attaching portion.

14. A windshield for a vehicle, comprising: the imaging apparatus as set forth in claim 1.

15. A vehicle, comprising: the imaging apparatus as set forth in claim 1.

* * * * *